(12) United States Patent
Licciardello et al.

(10) Patent No.: US 9,715,690 B2
(45) Date of Patent: Jul. 25, 2017

(54) AUTHORIZATION OF CASH DELIVERY

(75) Inventors: Donald C. Licciardello, Pennington, NJ (US); Rush Taggart, Princeton, NJ (US); John D. Licciardello, Pennington, NJ (US); Debra Lynn Licciardello, Pennington, NJ (US)

(73) Assignee: AMERICAN CASH EXCHANGE, INC., Pennington, NJ (US)

( * ) Notice: Subject to any disclaimer, the term of this patent is extended or adjusted under 35 U.S.C. 154(b) by 759 days.

(21) Appl. No.: 13/818,564

(22) PCT Filed: Aug. 25, 2011

(86) PCT No.: PCT/US2011/049172
§ 371 (c)(1),
(2), (4) Date: Feb. 27, 2013

(87) PCT Pub. No.: WO2012/027585
PCT Pub. Date: Mar. 1, 2012

(65) Prior Publication Data
US 2013/0151418 A1     Jun. 13, 2013

Related U.S. Application Data

(60) Provisional application No. 61/376,908, filed on Aug. 25, 2010.

(51) Int. Cl.
*G06Q 20/02* (2012.01)
*G06Q 20/40* (2012.01)
(Continued)

(52) U.S. Cl.
CPC ......... *G06Q 20/4012* (2013.01); *G06Q 20/02* (2013.01); *G06Q 20/10* (2013.01);
(Continued)

(58) Field of Classification Search
None
See application file for complete search history.

(56) References Cited

U.S. PATENT DOCUMENTS 5,351,296 A * 9/1994 Sullivan .......................... 705/70
6,327,578 B1 * 12/2001 Linehan ......................... 705/65
(Continued)

FOREIGN PATENT DOCUMENTS

| CN | 101501722 A | 8/2009 |
| WO | 99/01823 A1 | 1/1999 |
| WO | 02/09001 A1 | 1/2002 |

OTHER PUBLICATIONS

English Summary of Chinese Office Action for CN Application No. 201180051111.X dated Aug. 10, 2015.
(Continued)

*Primary Examiner* — John Hayes
*Assistant Examiner* — Tim Hale
(74) *Attorney, Agent, or Firm* — Harness, Dickey & Pierce, P.L.C.

(57) ABSTRACT

A computer-based method includes receiving, at a computer-based authorization system, a request to authorize payment to a first party at an electronic payment device from an account with funds that have been paid by a second party. The request includes an encrypted indication of an account number that corresponds to the account and a cash card number entered by the first party at the electronic payment device. The method further includes deriving an unencrypted version of the account number from the encrypted indication; comparing the unencrypted version of the account number to one or more identification codes in an electronic database, where one of the identification codes corresponds to the account; and authorizing payment from the account at the payment device based, at least in part, on whether the comparing yields a match between the unen-
(Continued)

crypted version of the account number and the identification code that corresponds to the account.

7 Claims, 14 Drawing Sheets

(51) Int. Cl.
  *G06Q 20/20* (2012.01)
  *G06Q 20/38* (2012.01)
  *G06Q 20/10* (2012.01)
  *G07F 19/00* (2006.01)

(52) U.S. Cl.
  CPC ....... *G06Q 20/1085* (2013.01); *G06Q 20/208* (2013.01); *G06Q 20/385* (2013.01); *G06Q 20/387* (2013.01); *G06Q 20/401* (2013.01); *G07F 19/203* (2013.01)

(56) References Cited

U.S. PATENT DOCUMENTS

| | | | |
|---|---|---|---|
| 7,155,418 B2 | 12/2006 | Matsuyama | |
| 7,195,151 B2 | 3/2007 | Licciardello et al. | |
| 7,416,115 B2 | 8/2008 | Licciardello et al. | |
| 8,038,058 B2 | 10/2011 | Licciardello et al. | |
| 8,131,636 B1* | 3/2012 | Viera et al. | 705/38 |
| 8,510,223 B2 | 8/2013 | Blair et al. | |
| 2004/0164145 A1 | 8/2004 | Licciardello et al. | |
| 2006/0022032 A1* | 2/2006 | Fillinger et al. | 235/379 |
| 2007/0198405 A1 | 8/2007 | Bishop et al. | |
| 2009/0061831 A1 | 3/2009 | Shastry | |
| 2009/0094155 A1 | 4/2009 | Baig et al. | |
| 2009/0099964 A1 | 4/2009 | Calderon Gonzalez | |
| 2009/0106118 A1 | 4/2009 | Pelegero et al. | |
| 2009/0119209 A1* | 5/2009 | Sorensen | G06Q 20/102 705/40 |
| 2009/0159695 A1 | 6/2009 | Licciardello et al. | |
| 2010/0082494 A1 | 4/2010 | Saxena | |

OTHER PUBLICATIONS

English translation of Russian Office Action for Application No. 2013112668/08(018759) dated Aug. 5, 2015.
English translation of Mexican Office Action for MX App. No. MX/a/2013/002228 dated Dec. 2, 2015.
International Preliminary Report on Patentability for PCT/US2011/049172, issued Feb. 26, 2013.
Extended European Search Report dated Jul. 16, 2016, corresponding to EP Application No. 11820662.2—1955/Patent No. 2609549, PCT/US2011/049172.

* cited by examiner

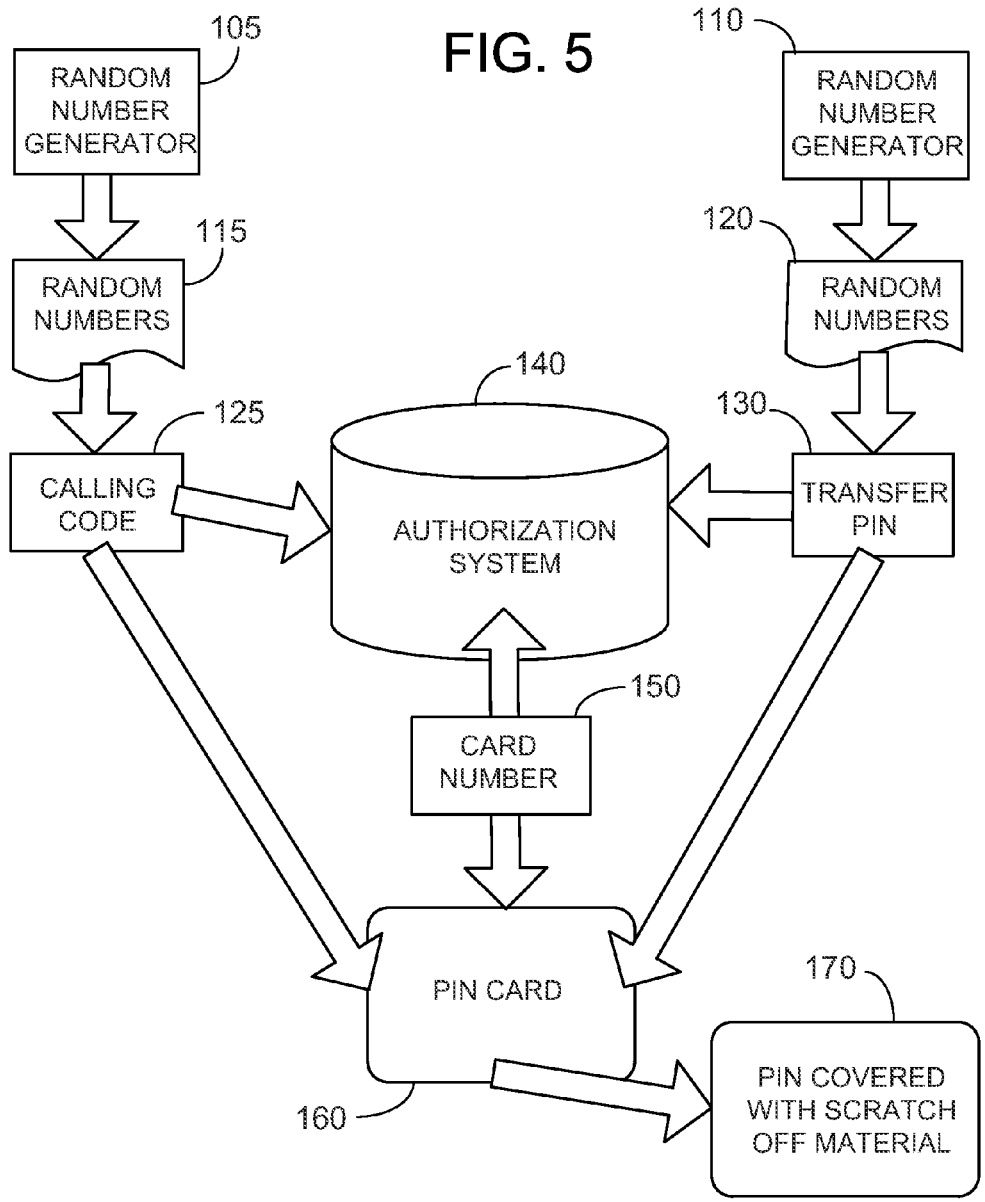

AUTHORIZATION OF CASH DELIVERY

CROSS-REFERENCE TO RELATED APPLICATIONS

This application is a U.S. national phase of PCT/US2011/049172, filed Aug. 25, 2011. This application claims the benefit under 35 U.S.C. §119(e) of U.S. Patent Application No. 61/376,908, entitled "Authorization System for Automated Teller Machine Cash Withdrawal," filed Aug. 25, 2010. The disclosures of the above applications are incorporated herein by reference.

BACKGROUND

This specification relates to computer-based systems and methods that facilitate the transfer of cash from one person ("sender") to another unspecified person ("receiver" or "recipient") at an unspecified, usually remote location.

Since people began interacting with others in far-off locations, there has been a need for transferring money to relatively remote locations. As electronic communications became increasingly prevalent, "money wiring" was developed to transfer money rapidly to distant locations. Today, people continue to find the need to send or receive money rapidly, in situations ranging from a parent sending money to a child away at college to a tourist in need of money in a foreign country after having a wallet or purse stolen. However, one drawback of conventional money wiring services is that they typically require a direct or indirect relationship with a bank or other financial institution. For example, some services require that the sending party have an existing bank account with the institution transferring the funds, whereas others require the sending party to present a credit card or other bank card with cash advance capabilities.

This may simply not be an option for some users, such as migrant or seasonal workers who want to send money back to family at a distant location, such as a foreign country, but do not have bank accounts or credit cards due to their itinerant nature or lack of credit history. Moreover, conventional money wiring services typically require that both the sending and receiving party have access to money wiring facilities such as a bank teller or a Western Union location and that such locations be open at the time of day when the sender wishes to send and the recipient seeks to retrieve the funds.

SUMMARY

This specification describes technologies relating to systems and techniques for transferring cash from one person to another.

More particularly, this specification relates to computer-based systems and methods that facilitate the transfer of cash from one person ("a sender") to another unspecified person ("a receiver" or "a recipient") at an unspecified, usually remote location. In a typical implementation, this is accomplished in a safe, convenient and low cost manner.

In general, one innovative aspect of the subject matter described in this specification can be embodied in computer-based methods that include receiving, at a computer-based authorization system, a request to authorize payment to a first party at an electronic payment device from an account with funds that have been paid by a second party. The request includes an encrypted indication of an account number that corresponds to the account and a cash card number entered by the first party at the electronic payment device. The method further includes deriving an unencrypted version of the account number from the encrypted indication; comparing the unencrypted version of the account number to one or more identification codes in an electronic database, where one of the identification codes corresponds to the account; and authorizing payment from the account at the payment device based, at least in part, on whether the comparing yields a match between the unencrypted version of the account number and the identification code that corresponds to the account.

Other embodiments of this aspect include corresponding systems, apparatus, and computer programs, configured to perform the actions of the methods, encoded on computer storage devices.

In some implementations, the request further includes an indication of a desired cash value and currency type entered by the first party at the payment device. In those implementations, the method further includes: comparing the desired cash value and currency type to each of one or more designated cash values and currency types associated with the respective identification codes in the electronic database. Authorizing the payment from the account is further based on whether the desired cash value and currency type match the designated cash value and currency type associated with the identification code that corresponds to the account.

According to some embodiments, the computer-based method includes storing, in the electronic database, the identification codes. Each identification code can correspond to a respective one of multiple accounts with funds that have been paid by a respective one of the second parties. The computer-based method also includes storing a cash value and currency type associated with each identification code. The stored cash value and currency type for each account is based on a designation provided by the second party who paid into that account.

Certain implementations include sending an indication to the payment device that the request to authorize has been granted. The payment device then dispenses the desired cash value and currency type in response to receiving the indication that the request to authorize has been granted.

In some implementations, deriving the unencrypted version of the account number entered by the second party includes invoking a host security module associated with the authorization system to derive the unencrypted version.

The first party, who initiated the request to authorize payment from the account, is typically different than the second party, who paid the funds into the account.

Another innovative aspect of the subject matter described in this specification can be embodied in a computer system that includes an electronic payment device (e.g., an automated teller machine "ATM") that is accessible by a first party (e.g., a "sender"); an authorization system coupled to the electronic payment device and configured to receive a request to authorize payment to the first party at the electronic payment device from an account with funds that have been paid by a second party. The request typically includes an encrypted indication of an account number that corresponds to the account and a cash card number entered by the first party at the electronic payment device, The authorization system includes a host security module to derive an unencrypted version of the account number from the encrypted indication; and a host computer coupled to the host security module to compare the unencrypted version of the account number to one or more identification codes electronically stored in an electronic database. One of the identification codes corresponds to the account.

The authorization system is configured to authorize payment from the account at the electronic payment device based, at least in part (or entirely), on whether the comparing yields a match between the unencrypted version of the account number and the identification code that corresponds to the account.

In some implementations, the request includes an indication of a desired cash value and currency type entered by the first party at the electronic payment device. The host computer can be further configured to compare the desired cash value and currency type to each of one or more designated cash values and currency types associated with the respective identification codes in the electronic database. Authorizing the payment from the account can be further based on whether the desired cash value and currency type match the designated cash value and currency type associated with the identification code that corresponds to the account.

A typical embodiment includes an electronic database for storing the identification codes and a cash value and currency type associated with each identification code. The stored cash value and currency type for each account typically is based on a designation provided by the party (e.g., the second party) who paid into that account.

The computer system, in some embodiments, is configured to send an indication to the electronic payment device that the request to authorize has been granted. The payment device can, in a typical implementation, be configured to dispense the desired cash value and currency type in response to receiving the indication that the request to authorize has been granted.

Yet another innovative aspect of the subject matter described in this specification can be embodied in a non-transitory, computer-readable medium (e.g., a compact disk or the like) that stores instructions executable by one or more processors to perform a method. The method includes receiving, at a computer-based authorization system, a request to authorize payment to a first party at an electronic payment device from an account with funds that have been paid by a second party. The request comprises an encrypted indication of an account number that corresponds to the account and a cash card number entered by the first party at the electronic payment device. The method also includes deriving an unencrypted version of the account number from the encrypted indication and comparing the unencrypted version of the account number to one or more identification codes in an electronic database, where one of the identification codes corresponds to the account. The method further includes authorizing payment from the account at the payment device based, at least in part (or entirely) on whether the comparing yields a match between the unencrypted version of the account number and the identification code that corresponds to the account.

Still another innovative aspect of the subject matter described in this specification can be embodied in a computer-based method that includes receiving, at a computer-based authorization system, a request to authorize payment to a first party at an electronic payment device from an account with funds that have been paid by a second party. The request typically includes an encrypted indication of an account number that corresponds to the account and a cash card number entered by the first party at the electronic payment device. The encrypted indication typically would have been encrypted using a network key (i.e., a key that is usable in the communications network to encrypt data).

The method further includes changing the encryption of the encrypted indication to produce a new version of the account number and cash card number entered by the first party at the electronic payment device. The new version is encrypted with a local encryption key, which is typically a different key than the network key. The local key, for example, may be a key that is accessible only to the computer-based authorization system, but not to the communications network.

The method also includes comparing the new version encrypted with the local encryption key to one or more identification codes in an electronic database. In a typical embodiment, the identification codes include every (or a very large number of) active account number respectively encrypted with every (or a very large number of) active cash card number using the local encryption key. One of the identification codes would correspond to the account.

The method further includes authorizing payment from the account at the payment device based, at least in part (or entirely), on whether the comparing yields a match between the new version and the identification code that corresponds to the account.

In some implementations, the request includes an indication of a desired cash value and currency type entered by the first party at the payment device. The method further includes comparing the desired cash value and currency type to each of one or more designated cash values and currency types associated with the respective identification codes in the electronic database. Authorizing the payment from the account may be further based on whether the desired cash value and currency type match the designated cash value and currency type associated with the identification code that corresponds to the account.

According to some embodiments, the computer-based method includes storing, in the electronic database, the identification codes. Each stored identification code typically corresponds to a respective one of multiple accounts that have funds that have been paid by a respective one of a plurality of second parties (e.g., "senders" as opposed to "receivers" or "recipients").

The computer-based method also typically includes storing, in an electronic database, a cash value and currency type associated with each identification code. The stored cash value and currency type for each account can based on a designation provided/amount paid by the second party who paid into that account.

In some implementations, the computer-based method includes sending an indication to the electronic payment device that the request to authorize has been granted. The electronic payment device is configured to dispense the desired cash value and currency type in response to receiving the indication that the request to authorize has been granted.

In certain embodiments changing the encryption of the encrypted indication (e.g., from an encryption using one key to an encryption using a different second key) includes invoking a host security module associated with (e.g, part of) the authorization system to change the encryption.

In a typical implementation, the first party, who initiated the request to authorize payment from the account, is different than the second party, who paid the funds into the account.

The electronic payment device can be, for example, an automated teller machine (ATM).

Another innovative aspect of the subject matter described in this specification can be embodied in a computer system that includes an electronic payment device accessible by a first party and a computer-based authorization system coupled to the electronic payment device.

The computer-based authorization system is configured to receive a request to authorize payment to the first party at the electronic payment device from an account with funds that have been paid by a second party (different than the first party). The request includes an encrypted indication of an account number that corresponds to the account and a cash card number entered by the first party at the electronic payment device. The encrypted indication has been encrypted using a network key.

The authorization system includes a host security module to change the encryption of the encrypted indication to produce a new version of the account number and cash card number entered by the first party at the electronic payment device. The new version typically is encrypted with a local encryption key. The authorization system also typically includes a host computer coupled to the host security module to compare the new version to one or more of a plurality of identification codes in an electronic database.

The identification codes typically include every active account number respectively encrypted with every active cash card number using the local encryption key. One of the identification codes corresponds to the account.

The authorization system typically is further configured to authorize payment from the account at the payment device based, at least in part (or entirely), on whether the comparing yields a match between the new version and the identification code that corresponds to the account.

In some implementations, the request further includes an indication of a desired cash value and currency type entered by the first party at the electronic payment device. The host computer typically is further configured to compare the desired cash value and currency type to each of one or more designated cash values and currency types associated with the respective identification codes in the electronic database. Authorizing the payment from the account typically is further based on whether the desired cash value and currency type match the designated cash value and currency type associated with the identification code that corresponds to the account.

According to certain embodiments, the computer system includes an electronic database for storing the identification codes and a cash value and currency type associated with each identification code. The stored cash value and currency type for each account can be based on a designation provided by the second party who paid into that account.

In a typical implementation, the authorization system is further configured to send an indication to the electronic payment device that the request to authorize has been granted. The payment device typically is configured to dispense the desired cash value and currency type in response to receiving the indication that the request to authorize has been granted.

The electronic payment device can be, for example, an automated teller machine (ATM).

Yet another innovative aspect of the subject matter described in this specification can be embodied in a non-transitory computer-readable medium that stores instructions executable by one or more processors to perform a method.

The method includes receiving, at a computer-based authorization system, a request to authorize payment to a first party at an electronic payment device from an account with funds that have been paid by a second party. The request typically includes an encrypted indication of an account number that corresponds to the account and a cash card number entered by the first party at the electronic payment device. The encrypted indication typically has been encrypted using a network key.

The method further includes changing the encryption of the encrypted indication to produce a new version of the account number and cash card number entered by the first party at the electronic payment device. The new version is encrypted with a local encryption key.

The method also includes comparing the new version encrypted with the local encryption key to one or more of a plurality of identification codes in an electronic database, wherein the identification codes include every active account number respectively encrypted with every active cash card number using the local encryption key. One of the identification codes typically corresponds to the account.

The method additionally includes authorizing payment from the account at the payment device based, at least in part, on whether the comparing yields a match between the new version and the identification code that corresponds to the account.

Still another innovative aspect of the subject matter described in this specification can be embodied in a computer-based method that includes receiving, at a computer-based authorization system, a request to authorize payment to a first party at an electronic payment device from an account with funds that have been paid by a second party. The request can include an encrypted indication of an account number that corresponds to the account and a cash card number entered by the first party at the electronic payment device.

The method further includes changing the encryption of the encrypted indication to produce a new version of the account number and cash card number entered by the first party at the electronic payment device. The new version is encrypted with a local encryption key.

The method also includes transforming the new version of the account number and cash card number to a transformed version by changing the cash card number portion of the new version to a universal cash card number.

The method additionally includes comparing the transformed version to one or more of the identification codes in the electronic database. One of the identification codes corresponds to the account.

The method further includes authorizing payment from the account at the electronic payment device based, at least in part, on whether the comparing yields a match between the transformed version and the identification code that corresponds to the account.

In some implementations, the request further comprises an indication of a desired cash value and currency type entered by the first party at the payment device. The method further includes comparing the desired cash value and currency type to each of one or more designated cash values and currency types associated with the respective identification codes in the electronic database. Authorizing the payment from the account is further based on whether the desired cash value and currency type match the designated cash value and currency type associated with the identification code that corresponds to the account.

In some embodiments, the computer-based method further includes storing, in the electronic database, the identification codes. Each identification code corresponds to a respective one of a plurality of accounts with funds that have been paid by a respective one of a plurality of second parties. The method further includes storing, in an electronic database, a cash value and currency type associated with each identification code. The stored cash value and currency type for each account is based on a designation provided by the second party who paid into that account.

In some embodiments, the computer-based method further includes sending an indication to the electronic payment device that the request to authorize has been granted. The electronic payment device typically is configured to dispense the desired cash value and currency type in response to receiving the indication that the request to authorize has been granted.

According to certain implementations, changing the encryption of the encrypted indication to produce a new version of the account number and cash card number entered by the first party at the electronic payment device comprises invoking a host security module associated with the authorization system to change the encryption.

In some implementations, transforming the new version of the account number and cash card number to the transformed version includes invoking the host security module associated with the authorization system to transform the new version.

The first party, who initiated the request to authorize payment from the account, typically is different than the second party, who paid the funds into the account.

According to some embodiments, the electronic payment device is an automated teller machine (ATM).

Another innovative aspect of the subject matter described in this specification can be embodied in a computer system that includes an electronic payment device accessible by a first party, a computer-based authorization system coupled to the electronic payment device and configured to receive a request to authorize payment to the first party at the electronic payment device from an account with funds that have been paid by a second party.

The request typically includes an encrypted indication of an account number and a cash card number entered by the first party at the payment device.

The authorization system typically includes a host security module configured to change the encryption of the encrypted indication to produce a new version of the account number and cash card number entered by the first party at the electronic payment device. The new version typically is encrypted with a local encryption key. The host security module typically is further configured to transform the new version of the account number and cash card number to a transformed version by changing the cash card number portion of the new version to a universal cash card number.

A host computer is configured to compare the transformed version of the account number and cash card number to one or more identification codes in an electronic database.

The authorization system typically is configured to authorize payment from the account at the electronic payment device based, at least in part, on whether the comparing yields a match between the transformed version and the identification code that corresponds to the account.

In some implementations, the request further includes an indication of a desired cash value and currency type entered by the first party at the electronic payment device. Moreover, the host computer may be further configured to compare the desired cash value and currency type to each of one or more designated cash values and currency types associated with the respective identification codes in the electronic database. Additionally, authorizing the payment from the account may be further based on whether the desired cash value and currency type match the designated cash value and currency type associated with the identification code that corresponds to the account.

According to certain embodiments, the computer system further includes an electronic database for storing the identification codes and a cash value and currency type associated with each identification code. The stored cash value and currency type for each account can be based on a designation provided by the second party who paid into that account.

The authorization system can be further configured to send an indication to the electronic payment device that the request to authorize has been granted, and the payment device can be configured to dispense the desired cash value and currency type in response to receiving the indication that the request to authorize has been granted.

In some implementations, the electronic payment device is an automated teller machine (ATM).

Still another innovative aspect of the subject matter described in this specification can be embodied in a non-transitory computer-readable medium that stores instructions executable by one or more processors to perform a method.

The method includes receiving, at a computer-based authorization system, a request to authorize payment to a first party at an electronic payment device from an account with funds that have been paid by a second party. The request can include an encrypted indication of an account number that corresponds to the account and a cash card number entered by the first party at the electronic payment device.

The method also includes changing the encryption of the encrypted indication to produce a new version of the account number and cash card number entered by the first party at the electronic payment device. The new version typically is encrypted with a local encryption key.

The method further includes transforming the new version of the account number and cash card number to a transformed version by changing the cash card number portion of the new version to a universal cash card number.

The method also includes comparing the transformed version to one or more of the identification codes in the electronic database. One of the identification codes typically corresponds to the account.

The method also includes authorizing payment from the account at the electronic payment device based, at least in part, on whether the comparing yields a match between the transformed version and the identification code that corresponds to the account.

Particular embodiments of the subject matter described in this specification can be implemented so as to realize one or more of the following advantages.

For example, systems and methods are provided for transferring money between a sender and receiver/recipient without requiring either party to have access to a bank account, credit card, or other preexisting relationship with a financial institution.

Moreover, the system and techniques presented here can be implemented using existing user interfaces at retail POS (POS) locations, automated teller machines (ATMs), and other cash dispensing units.

Moreover, a relatively simple process is disclosed for enabling and authorizing the cash transfers. In general, a sender at a first location purchases a card, referred to sometimes in this specification as a "PIN card," at a point of sale, such as a retail location or a bank teller. Upon purchase of a PIN card, a string or transfer PIN associated with the PIN card is activated in an authorization system, with the string or transfer PIN also associated with a value corresponding to the purchase amount of the PIN card (e.g., 3,000 Mexican pesos). The sender contacts an intended recipient at a remote location and discloses the string or transfer PIN to that intended recipient. In certain embodiments, the recipient needs only this string or transfer PIN and a card, sometimes referred to in this specification as a "cash card," to receive the money transfer at a participating remote location. Also, in some embodiments, almost any cash card can be used with any valid transfer PIN to receive value transfers. To receive the value associated with the PIN card, the recipient inserts/swipes or otherwise enters information associated with the cash card at a participating dispensing unit such as an ATM, which reads and routes appropriate transaction information to an authorization system. The recipient then enters the string or transfer PIN, which the authorization system identifies as being a valid entry that is associated with the value amount associated with the PIN card. The authorization system then authorizes the dispensing unit to dispense that value amount and the dispensing unit dispenses.

The systems and techniques disclosed herein provide for highly accurate authorization of requested cash deliveries in an efficient, cost effective manner.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 5 is a schematic representation of an process for generating a PIN card and associated information.

DETAILED DESCRIPTION

The present disclosure relates to computer-based systems and methods that enable a sender to transfer money to an unspecified receiver (recipient) at an unspecified, usually remote location in a safe, secure manner. More particularly, this disclosure relates to computer-based systems and methods for authorizing the delivery of money to the unspecified receiver at an automatic teller machine (ATM), for example, requesting such delivery. In a typical implementation, the systems and methods can be implemented using existing financial or electronic banking networks, including automatic teller machines (ATMs) and without the need for extensive new infrastructure at either the sending or receiving location.

Unless otherwise indicated or apparent from context, the terms "sender," "receiver," "recipient" and the like, as used herein, refer to humans, not machines.

Overview of Systems and Methods

Figure 1:
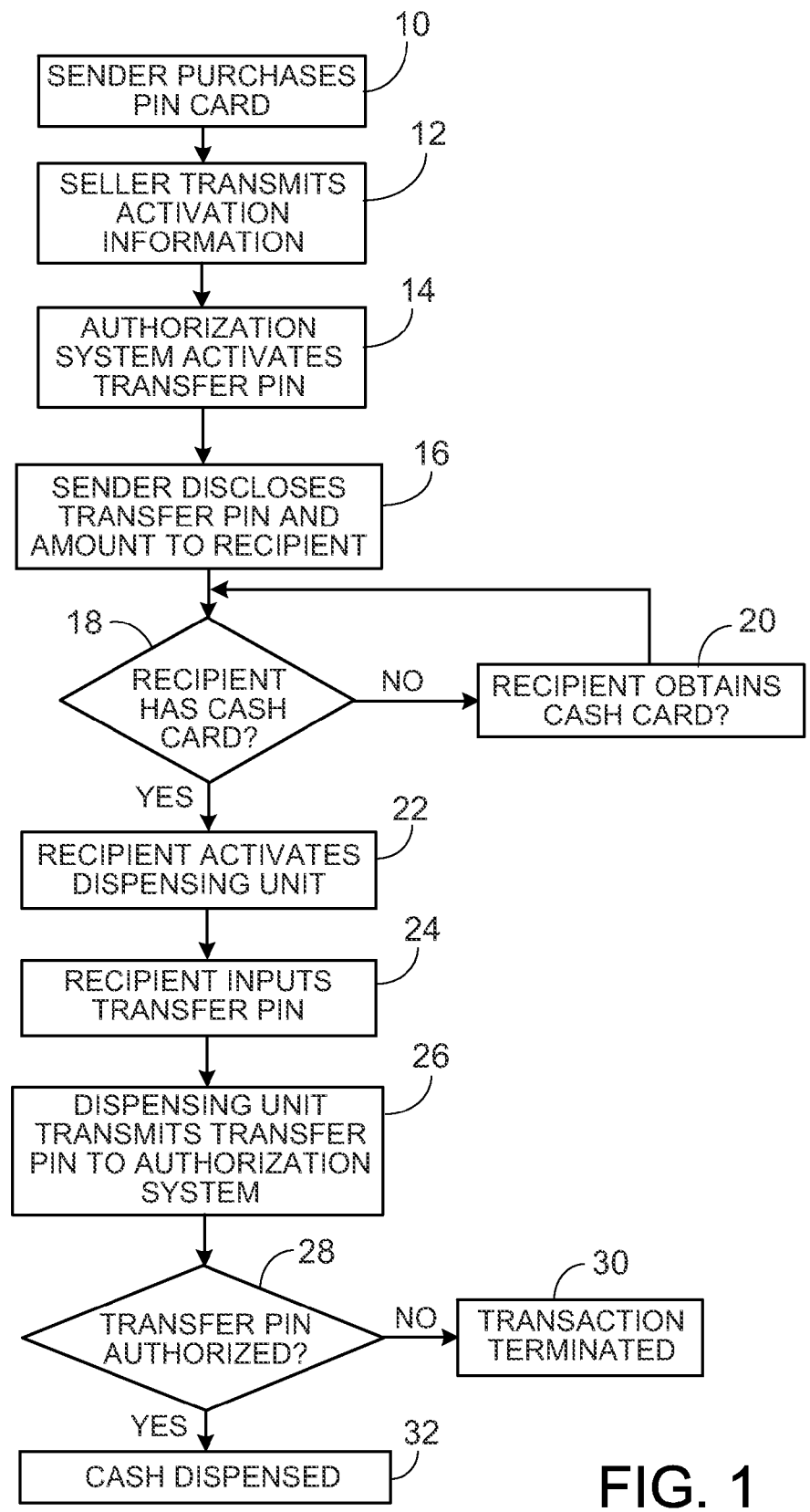
FIG. 1 is a flowchart showing an implementation of a computer-based method in which one party designates money for transfer to an unspecified other party at an unspecified, usually remote location.

FIG. 1 is a flowchart showing an implementation of a computer-based method in which a sender designates money for transfer to an unspecified receiver at an unspecified, usually remote location.

According to the illustrated method, a sender (at 10) purchases a PIN card. Typically, this purchase can occur at any number or type of retail or other establishments or locations.

In the illustrated embodiment, the PIN card is associated with a predetermined value in a denomination of the intended recipient's community. For example, a Mexican migrant worker in the United States intending to send money to his or her family member can use U.S. dollars to purchase a PIN card having a predetermined value in Mexican pesos (e.g., 1,000 pesos, 2,000 pesos, etc.). Other values of PIN cards may be made available as well including, for example, multiples of whole number amounts of the local currency at the sender's location or amounts specified by the sender or PIN card seller. Additionally, PIN cards can be sold in and for various and differing currency units. As an example, a foreign exchange kiosk at an international airport might, for appropriate fees, accept a wide range of foreign currencies to purchase PIN cards associated with values in an equally wide range of foreign currency units.

In a typical implementation, each PIN card has a unique code (referred to herein as a "transfer PIN") that enables an intended receiver in possession of the code to access the value associated with the card at one of many different possible locations.

The cost to the sender in purchasing the PIN card could be, for example, the value associated with the PIN card converted to a local currency (e.g., U.S. dollars) using an applicable exchange rate at the time of the transaction (i.e., the purchase and/or activation of the PIN card), plus one or more service fees payable to the operator of the system 100 and/or the POS location operator.

An activation request with activation information is then transmitted (at 12) over a communications network to a computer-based authorization system. If the authorization system determines based on the transmitted information that the PIN card should be activated, then the authorization system (at 14) activates the transfer PIN associated with the value corresponding to the purchase amount of the PIN card. For example, if the sender in the United States wants to transfer 3,000 Mexican pesos to a friend in Mexico, the purchase price of the PIN card could be the U.S. equivalent of 3,000 pesos, plus a seller's fee or commission, plus a fee or commission to the authorization system. In this example, once the transfer PIN is activated, it is associated in the authorization system with the value of 3,000 Mexican pesos.

Continuing further with the example depicted in FIG. 1, the sender (at 16) discloses the transfer PIN, the amount of value associated with the transfer PIN and, in some instances, the currency type (e.g., U.S. dollars, Mexican pesos, etc.) of the amount of value associated with the PIN card to the intended recipient. This disclosure of information can be done in a number of possible ways, for example, by telephone or by other means that the sender and intended recipient choose.

According to the illustrated method, the recipient needs a cash card (in addition to the transfer PIN, value and/or currency type) in order to retrieve the funds to be transferred from the sender. Accordingly, the recipient determines (at 18) whether he or she has a cash card. If not, then the intended recipient (at 20) obtains a cash card.

Once the intended recipient has possession of a cash card, the intended recipient uses (at 22) the cash card to activate a participating dispensing unit. In some embodiments, the dispensing unit is an ATM. Activating the participating dispensing unit typically involves swiping the cash card at the ATM. This causes the ATM to enter an operational mode that enables it to interact with the intended receiver and other components of the system described in this disclosure in a manner that facilitates the disclosed techniques.

Once the dispensing unit is activated, the intended recipient enters (at 24) the transfer PIN that was disclosed by the sender into the dispensing unit. This can be done, for example, by using a keypad on the ATM and responding to one or more prompts from the ATM.

After the intended recipient enters the transfer PIN at the dispensing unit, the dispensing unit transmits (at 26) the transfer PIN (and, in some instances, other information) to the remotely-located authorization system. The authorization system determines (at 28) whether the transfer PIN is authorized (e.g., whether the transfer PIN has been activated and is associated with a value). As explained in more detail below, there are a number of techniques that the authorization system can use to make this determination. In a typical implementation, however, the authorization system is operable in this regard to strike an appropriate balance between security of the system and convenience of the users.

According to the illustrated method, if the authorization system determines (at 28) that the transfer PIN is not authorized, then the authorization system (at 30) notifies the dispensing unit not to dispense any funds. In that case, the dispensing unit then terminates the transaction without dispensing any funds. On the other hand, if the authorization system determines (at 28) that transfer PIN is authorized, then the authorization system (at 32) signals the dispensing unit to dispense an amount of funds equal to the value associated with the transfer PIN. In the example described above, this amount would be 3,000 Mexican pesos.

Figure 2:
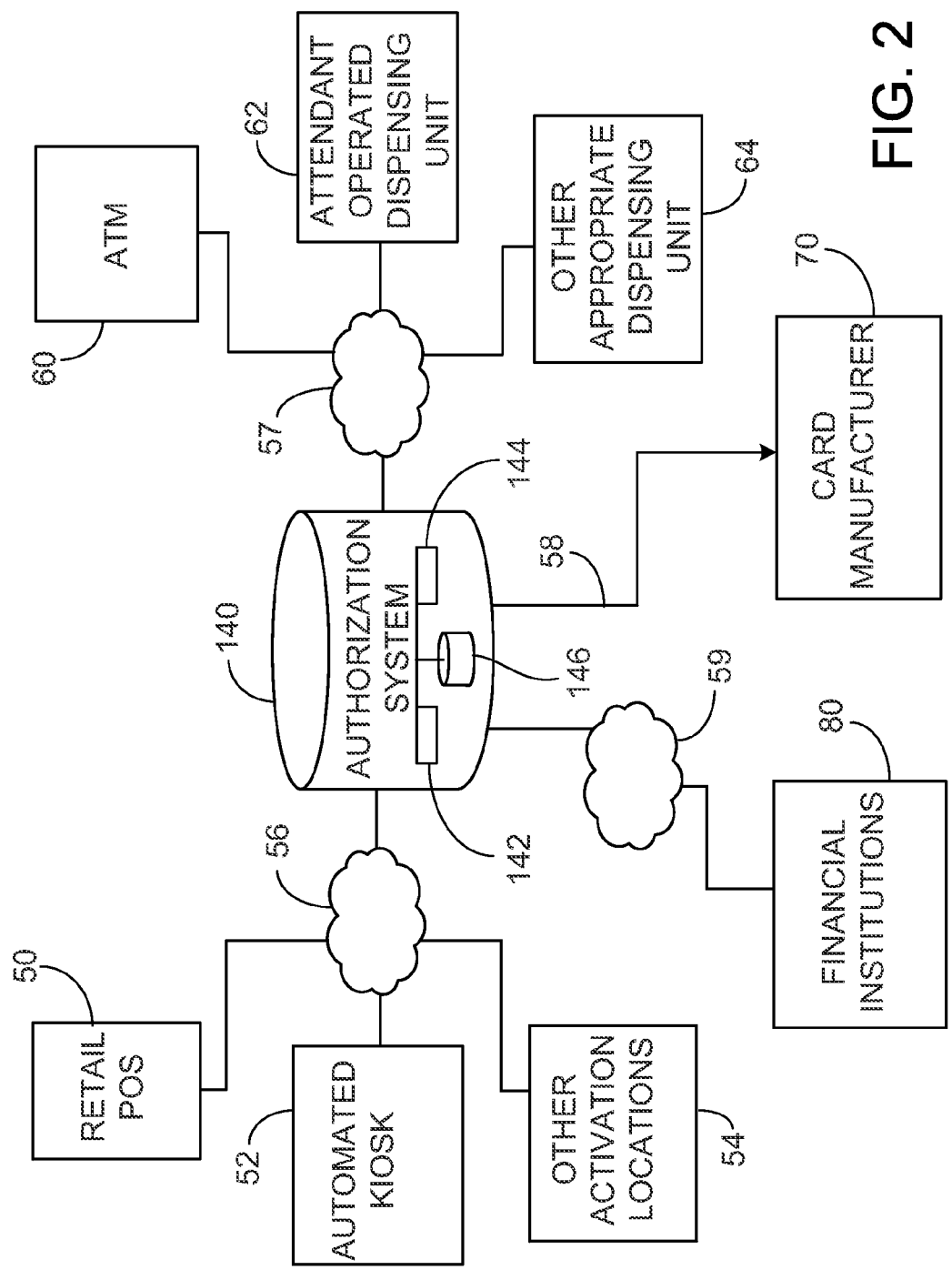
FIG. 2 is a schematic diagram of an exemplary computer-based system for facilitating the transfer of funds from the sender to the receiver or recipient.

FIG. 2 is a schematic diagram of an exemplary computer-based system for facilitating the transfer of funds from a sender to a recipient.

In a typical implementation, the system facilitates this transfer of funds by enabling the sender to purchase a unique personal identification number ("PIN") that has a designated cash value associated with it and for the receiver to access cash in the designated amount by using the PIN and a generic system access card ("cash card") at a remotely-located cash dispensing unit.

In this regard, the illustrated system has numerous computer-based interfaces at locations where the sender can obtain a PIN (e.g., by purchasing a card with the PIN printed or otherwise stored thereon). These include a retail POS 50, an automated kiosk 52 and other activation locations 54. The illustrated system also has numerous computer-based interfaces at locations where a receiver can use the PIN and a cash card to access cash having a value designated by the sender. These include an ATM 60, an attendant operated dispensing unit 62 and other appropriate dispensing units 64.

The illustrated system also has an authorization system 140, which is generally operable to authorize the distribution of cash to a receiver at the ATM 60, attendant operated dispensing unit 62 and/or other appropriate dispensing units 64. The illustrated authorization system 140 includes a host computer 142 coupled to a host security module 144 and an electronic database 146. In general, the illustrated components—alone or in combination with other components—are adapted to implement various techniques, which are disclosed herein. In some implementations, the components of the authorization system 140 vary from what is shown in the figure. Moreover, the illustrated components can be at different physical locations.

In the illustrated implementation, the computer-based interfaces at the retail POS 50, the automated kiosk 52 and the other activation locations 54 are coupled to the authorization system 140 via communications network 56. Similarly, the ATM 60, attendant operated dispensing unit 62 and other appropriate dispensing units 64 are coupled to the authorization system 140 via communications network 57.

The illustrated system 100 also has computer-based interfaces at a financial institution 80 and a cash card manufacturer 70, which are coupled to the authorization system 140 via communications network 59 and line 58.

The various computer-based devices illustrated in FIG. 1 can be coupled to the authorization system 140 in a variety of ways.

In a typical implementation, the authorization system 140 includes one or more computer components with appropriate communications, security, and information processing software, as well as databases and appropriate storage media as appropriate to implement or facilitate the techniques disclosed herein.

In general, during system operation, the authorization system 140 is adapted to communicate with one or more computer-based interfaces at sender locations, such as retail POS 50, automated kiosk 52, and other PIN activation locations 54 via communications network 56; recipient units, such as ATM 60, attendant-operated dispensing units 62, and other appropriate dispensing units 64 via communications network 57; the financial institution interfaces 80 via communications network 59; and cash card manufacturer interfaces 70 via an information transfer line 58.

Information received from a sender's location can include, for example, a PIN (e.g., imprinted on a PIN card), the amount of value to be associated with the PIN for transfer to a receiver and the type of currency to be transferred. Typically, this information is sent to the authorization system 140 and stored in a manner accessible to the authorization system 140 when a PIN is activated.

Information received from a recipient's location can include, for example, a first data string, such as a cash card number (sometimes referred to herein as a "PAN") and a second data string, for example a PIN. Other information may be received from a recipient's location as well including, for example, other strings used, in conjunction with a sweepstakes or a promotion. In some implementations, the information received from a recipient's location is encrypted. For example, in some implementations, the PIN and PAN are encrypted to form a PIN block. Typically, this information is sent to authorization system 140 in response to the receiver using a cash card to access the system (e.g., at an ATM), entering a PIN and a request that cash be dispensed to the receiver.

In some embodiments, the authorization system 140 receives various information from the cash card manufacturer(s) and, depending on the embodiment, the authorization system 140 may communicate with one or more financial institutions 80, for example, to debit or credit a corporate disbursement account when funds are to be dispensed or when a PIN is purchased.

In general, the authorization system 140 receives information from various sources, stores and/or processes the received information, for example, to perform security and verification checks, compare received and stored data, make appropriate record keeping entries, and authorize disbursements to receivers according to the various techniques disclosed herein.

Exemplary PIN Card

Figure 3A:
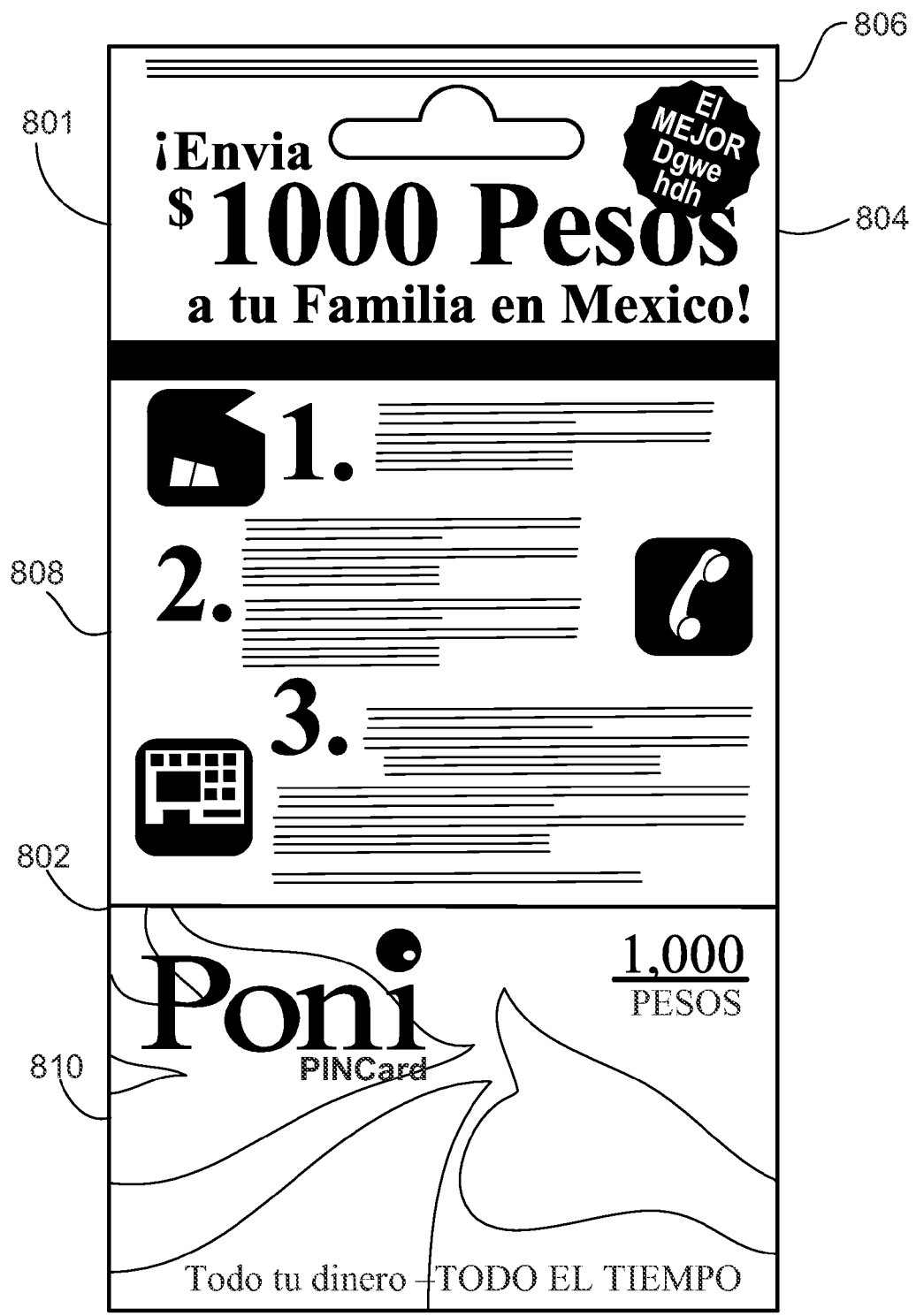
FIG. 3A is a front view of an exemplary PIN card as might be purchased by a sender.

FIG. 3A shows an example of a front side of a PIN card as might be purchased by a sender, for example (at 10 in FIG. 1, above).

As depicted in FIG. 3A, PIN card 160 is constructed of plastic or other suitable material as is conventionally used for credit cards, debit cards or gift cards. PIN card 160 as depicted in FIG. 3A is a single piece, approximately the dimensions of three standard credit cards, and with scoring 802 to permit easy detachment of the bottom third as a separate card. As shown in FIG. 3A, the top third 801 of the PIN card 160 includes an advertising message 804 that includes the amount of cash that may be transferred using the particular card, and a legend 806 (in Spanish in FIG. 3A) that the card has no value until it is activated. The middle third 808 of the PIN card includes basic instructions (again in Spanish), on how to use the card. In the example depicted in FIG. 3A, the bottom third 810, which may be detached, includes a logo and design.

Figure 3B:
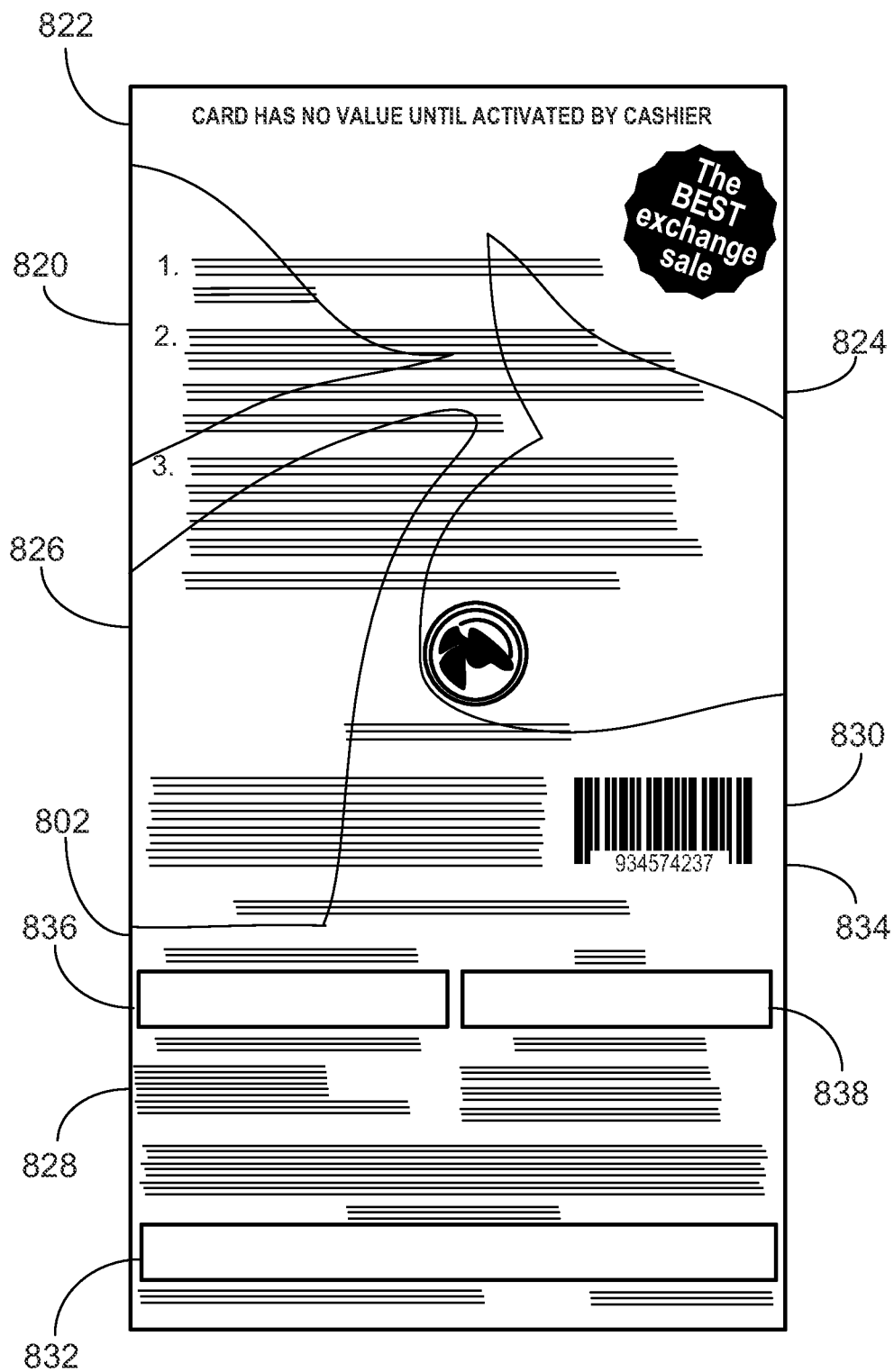
FIG. 3B is a rear view of the PIN card in FIG. 3A.

FIG. 3B provides a depiction of the back of the PIN card 160 depicted in FIG. 3A.

As depicted in FIG. 3B, the top third 820 of the back of the PIN card 160 includes the legend 822 (in English) from the top third of the front of the PIN card 160, along with instructions 824 in English on how to use the card, corresponding to the Spanish instructions on the middle third of the front of the card, as depicted in FIG. 3A. As also depicted in FIG. 3B, the top third 820 and the middle third 826 of the back of the PIN card 160 include instructions in English, on how to obtain a cash card (i.e., the card that the intended recipient can use to access the system and request the delivery of funds) and on how to use a designated international telecommunications carrier to call the intended Recipient to inform him or her of the transfer PIN 130 and the value represented by the card (1,000 pesos in this example) once authorized. In the example depicted in FIG. 3B, the middle third 826 of the back of the PIN card 160 includes terms and conditions on the use of the card. The middle third 826 of the back of the PIN card 160 also includes a number 834 and its corresponding UPC bar code 830 that identifies the particular PIN card product.

In the embodiment depicted in FIG. 3B, the bottom third 828 of the back of the PIN card 160 includes Spanish-language instructions and terms and conditions corresponding to the English-language instructions and terms and conditions on the middle third 826 of the back of the PIN card 160, as well as Spanish-language instructions on how to get a cash card and on how to use a designated international telecommunications carrier to call the intended recipient to inform him or her of the transfer PIN 130 and the value represented by the card once authorized. The bottom third 828 of the back of the exemplary PIN card 160 depicted in FIG. 3B also includes a magnetic stripe 832 for recording electronically encoded information. In some embodiments, the magnetic stripe 832 encodes a 16 digit card number that identifies a particular PIN card 160, for example, with the first six digits being an Issuer Identification Number (IIN), the next nine digits being an internal unique card number, and the final digit being the check digit that is calculated from the preceding 15 digits using an algorithm. The check digit can, in some instances, help assure accurate electronic transmission of the other digits.

In the embodiment depicted in FIG. 3B, the bottom third 828 of the back of the PIN card 160 also includes scratch-off areas 836 and 838, which are coated with a film or other material suitable for hiding information under it, while permitting the hidden information to be revealed when the film or other material is scratched or rubbed with a coin or other relatively rigid object. In this example, scratch-off area 836 hides a 12-digit calling code that enables a caller to make a toll-free call to an intended recipient of the value represented by the PIN card, and scratch-off area 838 hides a 12-digit transfer PIN. However, in other embodiments, the 12-digit calling code and the 12-digit transfer PIN may be hidden by a single scratch-off area. As instructed on the back of the PIN card 160, a sender calls the designated international telecommunications carrier using the listed number, then enters the 12-digit calling code, enters an appropriate country code, and then enters the telephone number of the intended recipient. Upon reaching the intended recipient, the sender then discloses the 12-digit transfer PIN and the amount of value associated with the PIN card and, if necessary, the instructions on how to obtain a cash card. The intended recipient then is able to access the funds, for example, at a nearby ATM.

Exemplary Cash Card

Figure 4A:
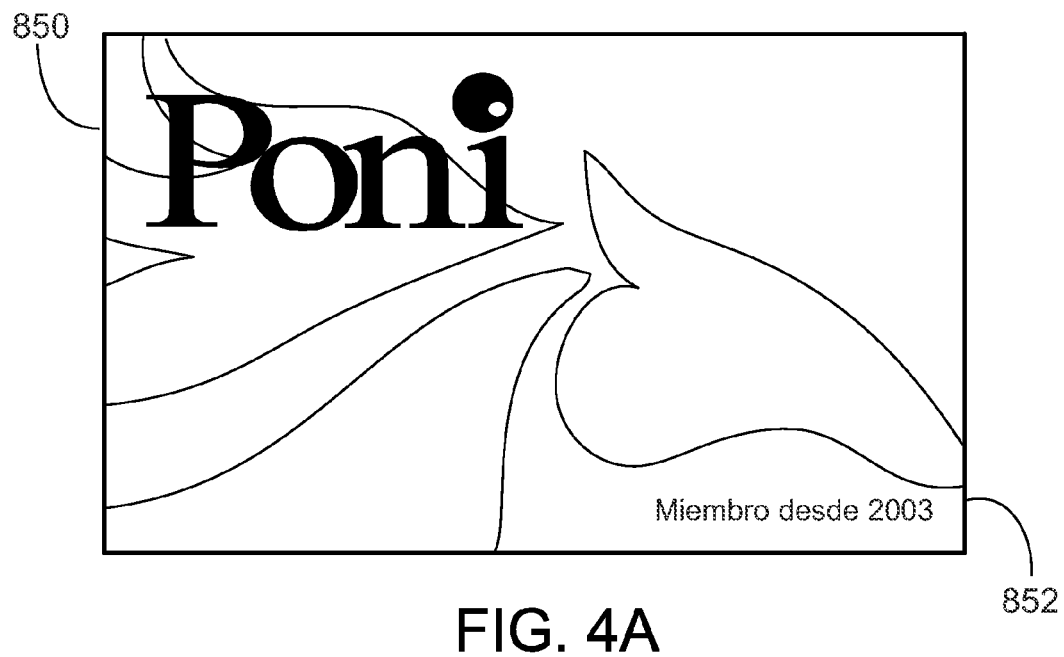
FIG. 4A is a front view of an exemplary cash card as might be obtained by a recipient of a cash transfer to access the system and request the delivery of the designated funds.

FIG. 4A shows the front of an exemplary cash card (e.g., a card that enables an intended recipient to access the system and request the delivery of requested funds). In the illustrated embodiment, the front 850 of the cash card 310 includes a logo and design, as well as a legend 852 (in Spanish in FIG. 4A) identifying the year that the cash card was printed.

Figure 4B:
FIG. 4B is a rear view of the cash card of FIG. 4A.

FIG. 4B shows the back of the cash card of FIG. 4A. In the illustrated embodiment, the back 860 of the cash card 310 includes a magnetic stripe 862 for recording electronically encoded information. In some embodiments the magnetic stripe 862 encodes a 16 digit card number that identifies a particular cash card 310, with the first six digits being a bank (or issuer's) identification number (BIN) which serves to route cash card transaction information from the dispensing unit to the authorization system 140. The next nine digits comprise a unique card number associated with the cash card 310, and the final digit is a check digit that is calculated from the preceding 15 digits using a specified algorithm. The check digit typically helps to assure accurate electronic transmission of the other digits.

In the example shown in FIG. 4B, the 16-digit cash card number 350 also is displayed in human readable form. The back 860 of the cash card 310 also includes language 864 identifying the cash card 310 as property of the issuer of the card, as well as telephone numbers 866 that can be called for information or customer assistance.

Generating PIN cards and Associated Information

FIG. 5 represents a process for generating a PIN card and associated information, such as transfer PINs and calling codes.

According to the illustrated process, random number generators 105 and 110 are used to generate two random numbers 115 and 120, respectively. In some embodiments, random numbers 115 are twelve digits long and are used to generate a calling code 125, which may be printed on the PIN card 160. The calling code 125 also is stored in an electronic database of the authorization system 140, which comprises an electronic database and other associated software and hardware for storing and/or manipulating the data stored in the database. In a typical implementation, the calling code 125 may be used by the sender, in conjunction with a designated international telecommunications carrier using a toll-free number printed on the PIN card, to call the intended recipient to pass along the transfer PIN 130.

In some embodiments, random number 120 is 12 digits long and is used as a transfer PIN 130 and printed on PIN card 160. In some embodiments, the transfer PIN 130 is stored in the electronic database of the authorization system 140. In some embodiments, each transfer PIN 130 is essentially unique. Moreover, the transfer PINs typically are checked for uniqueness against previously generated transfer PINs 130 to ensure that there is no duplication within a specified time period. This provides a high degree of confidence that two or more identical transfer PINs 130 will not become active simultaneously. For example, in one embodiment, more than a predetermined number of months, such as twelve, would be required to elapse after a specific 12-digit transfer PIN had been used for a funds transfer before it could be activated again for use with the same authorization system 140.

In some embodiments, the PIN card 160, in addition to having the calling code 125 and transfer PIN 130 printed on it, is also assigned a card number 150, which is stored in authorization system 140. In some embodiments, the card number 150 has 16 digits, where the first 6 digits comprise an Issuer Identification Number (IIN), which serves to route transaction information from a POS terminal at a retail location, for example, to the authorization system 140, the next nine digits comprise a unique card number associated with the specific PIN card 160, and the final digit is a check digit to help assure accurate electronic transmission.

Card number 150 may be stored on PIN card 160, for example in a storage medium such as a magnetic stripe or printed on the card in a human readable format. In embodiments, the card number 150 is not directly associated with a particular money transfer transaction but instead may be used to keep track of the use and purchase of PIN cards and transfer PINs, and for market research, promotions and sweepstakes, and other business reasons. In some embodiments, the calling code 125 and transfer PIN 130 are both associated with the card number 150 in an electronic database of the authorization system 140.

According to the illustrated implementation, the calling code 125 and transfer PIN 130 printed on the PIN card are covered (at 170) with opaque material to keep them from being known prior to purchase of the PIN card 160. Calling code 125 and transfer PIN 130 may be covered by a single scratch-off surface or by separate scratch-off surfaces. Other suitable means for hiding Calling Code 125 and transfer PIN 130, such as peel off tape, microencapsulation of ink patterns, radio or electronic readers, and the like, may be used as well.

It should be understood that, for calling code 125, transfer PIN 130 and card number 150, other shorter or longer strings may be used for greater or lesser security, balanced against ease and convenience of use. Similarly, calling code 125, transfer PIN 130 or card number 150 may comprise alphanumeric or other strings consistent with various types of strings that are capable of being read by or input into dispensing units and financial and other electronic networks at various locations. In some embodiments, the calling code 125 and transfer PIN 130 could be the same, i.e., the transfer PIN functions as the calling code.

Storing Transfer PIN Information

There are a variety of ways in which the authorization system 140 can store data associated with the generated transfer PINs.

Figure 6:
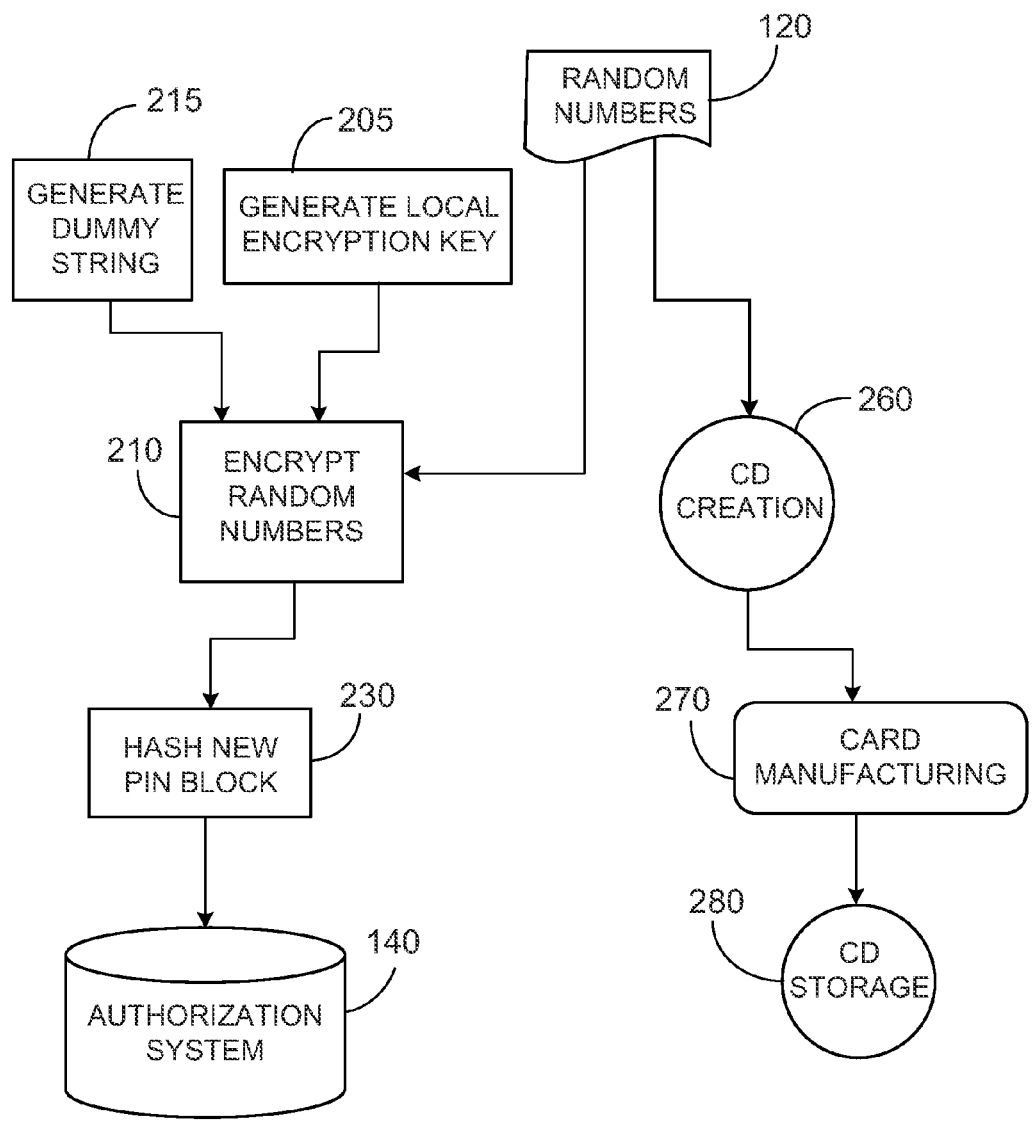
FIG. 6 is a schematic representation of an exemplary process for storing transfer PINs.

FIG. 6 shows one example of how the authorization system 140 stores transfer PINs. The illustrated method includes storing the transfer PINs in an electronic database in the authorization system 140, for later comparison with information received from a receiver requesting authorization for a cash distribution.

In the illustrated embodiment, random numbers 120, which serve as the transfer PINs and may include, for example, 12-digit strings, are generated and then encrypted (at 210) using a local encryption key, which is generated at 205, and using a character from a dummy string, which is generated at 215. This produces an encrypted PIN Block. In certain embodiments, the dummy string is a constant number that is used in encrypting all of the transfer PINs 130.

The encrypted PIN block is hashed (at 230) and put into the electronic database in the authorization system 140. In some embodiments, the encryption (at 210) and hashing (at 230) are performed by computing devices in the authorization system 140. In the embodiment depicted in FIG. 6, the 12-digit strings that form the transfer PINs 130 are not stored in a "clear," non-encrypted form in the authorization system 140. In a typical implementation, this helps enhance the security associated with the transfer PINs.

Additionally, in the illustrated example, the random numbers 120 that form the transfer PINs 130 are stored in a non-encrypted form. The non-encrypted storage is done on a compact disk ("CD") that can be removed from the system and, therefore, would be inaccessible by the system. In a typical implementation, CD storage is done to keep a record of the actual generated transfer PINs in the event that the encrypted PINs are lost or the transfer PIN data somehow becomes corrupted. The random numbers 120 are stored on a CD (at 260) and are used as transfer PINs 130 in PIN card 160 manufacturing process 270.

The CD that is created (at 260), which stores the generated, non-encrypted transfer PINs 130, is kept (at 280) in a secure location, such as a safe, and is accessed if needed (for example, if the encrypted PINs are lost).

There are a variety of other ways in which the authorization system 140 can store data associated with the generated transfer PINs.

Distributing and Tracking Cash Cards

Figure 7:
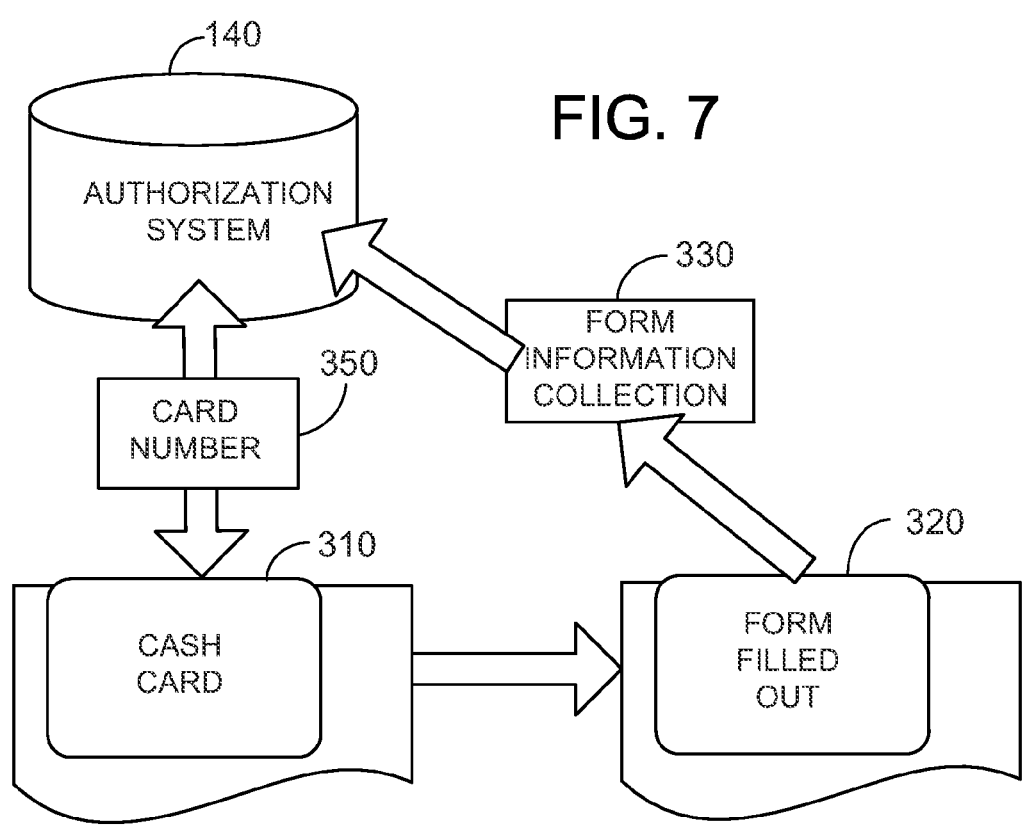
FIG. 7 is a schematic representation of an exemplary process for distributing and tracking a cash card.

FIG. 7 represents an exemplary process for distributing and tracking a cash card 310.

In a typical implementation, cash cards 310 are distributed free of charge to recipients by one or more methods. For example, in one implementation, the cash cards may be intended to facilitate money transfers between migrant or seasonal workers in the United States and their families in Mexico. In such instances the cash cards 310 could be made available free of charge at local banks and businesses or fairs or other events or gatherings in Mexico, or could be available by request through the mail, over the Internet or via other suitable means, such as by e-mail or by calling a toll-free number.

According to some embodiments, the recipient fills out a form 320 prior to receiving the cash card 310. Depending upon the scope of services to be offered in conjunction with the funds transfers, the form 320 may request a variety of types of information, such as detailed information to identify the user of each cash card 310, or general information to be collected for marketing reasons. In certain embodiments, the completed form 320 is collected 330, and the form information is stored in the authorization system 140.

In some embodiments, the cash cards 310 are assigned card numbers 350, which are stored in the authorization system 140. The card number 350 also may be stored on the cash card 310, for example, on a storage medium such as a magnetic stripe or printed on the card in a human readable format. The card number 350 can be 16 digits, for example, with the first six digits form a Bank Identification Number (BIN) which serves to route cash card transaction information from a dispensing unit to the authorization system 140, the next nine digits form a unique card number that is associated with the cash card 310, and the final digit is a check digit. In some embodiments, the card number 350 may be used to keep track of the use of the card and for market research, promotions and sweepstakes, and other business reasons.

Distributing and Activating a PIN Card

Figure 8:
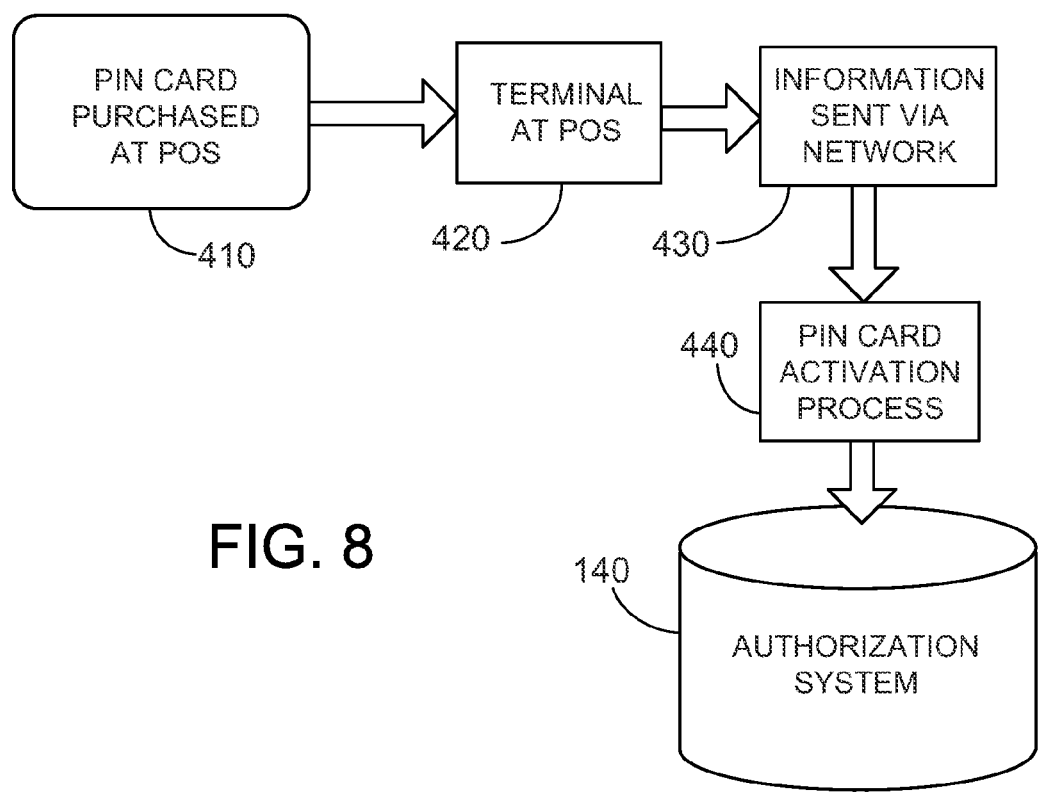
FIG. 8 is a flowchart of a method for purchasing and activating a PIN card.

FIG. 8 is a flowchart of a method for purchasing activating a PIN card.

According to the illustrated method, a user (e.g., a sender) purchases and activates a PIN card from a POS location using a computer-based POS terminal 420. In a typical implementation, POS terminals will be placed at numerous retail locations such as convenience stores or gas stations and/or any other suitable locations to reach desired customers.

As discussed herein, each PIN card 160 typically has an associated PIN and is associated with a predetermined value, in a denomination that corresponds to the community of the intended recipient. For example, for Mexican migrant workers in the United States, the PIN cards 160 could be sold for U.S. dollars in multiples of whole currency units of Mexican pesos (e.g., 1,000 pesos, 2,000 pesos, etc.). The cost to the sender could for example be the value of the card converted to the local currency (e.g., U.S. dollars) using an applicable exchange rate at the time of the transaction, plus a transaction fee or commission to the operator of the system as well as to the PIN card seller.

Other values of PIN cards 160 could be used as well, including, for example, multiples of whole number amounts of the local currency at the sender's location, or other amounts selected by the sender or the seller of the PIN cards 160. Additionally, PIN cards 160 could be sold in and for various and differing currency units. As an example, a foreign exchange kiosk at an international airport might, for appropriate fees, accept a wide range of foreign currencies to purchase PIN cards 160 associated with values in an equally wide range of foreign currency units.

In some implementations, such as the one shown, a PIN card 160 is swiped and other PIN-related information is entered (at 420) at a computer-based POS terminal. In response to this, the POS terminal transmits (at 430) information including a PIN activation request across a communications network 56 to the authorization system 140. In various implementations, the PIN activation request includes information that facilitates the PIN card activation process (at 440). The information associated with the PIN card 160 can be entered into the POS terminal in a variety of ways, including for example, by using a magnetic strip reader to draw the information off the PIN card, by using a keypad and/or by reading the information to a telephone voice response unit or live operator, who then enters the information into an authorization system 140.

In certain embodiments, the information transmitted to the authorization system in this regard includes the amount of value and the foreign currency units associated with the PIN card 160. In some embodiments, the amount of value and foreign currency units associated with the PIN card 160 may have themselves been previously associated with the PIN card number 150. In certain embodiments, the information transmitted to authorization system 140 also includes other information, such as information appropriate to verify the PIN card seller, to track the PIN card seller's sales of PIN cards and/or to identify the sender who purchased the PIN card.

According to the illustrated embodiment, the authorization system 140 activates the PIN card (at 440). In various implementations, activation can include, for example, completing verification checks on any or all of the seller, the sender, and the PIN card number. Such verification checks can include a variety of heuristics designed to prevent crime or fraud. The particular heuristics used may vary depending upon the specific practical implementation and may depend upon the level of security and crime prevention desired, any applicable regulatory requirements, and other relevant factors.

In some embodiments, the authorization system 140 identifies the PIN card number 150 and associates it with a specific transfer PIN 130. After verification and authorization procedures have been successfully completed, PIN card 160 is considered activated, and the transfer PIN 130 and the calling code 125 are considered activated. In certain embodiments, in authorization system 140, an activated PIN card is reflected in a record flagged as active that associates a specific transfer PIN 130 with a card number 150 and a calling code 125, as well as an amount of value in a particular currency unit (e.g., 3,000 Mexican Pesos).

After the PIN card is activated, the seller is signaled, through the communications network or other suitable means, that the PIN card 160 has been activated so that the sender may be informed.

In some embodiments, the seller may itself be an interactive electronic device, such as an ATM, that accepts cash or debit or credit cards, permits the selection of currency units and amounts, automatically signals and communicates with the authorization system 140 in response to the sender's commands and inputs, and dispenses activated PIN cards 160 or confirms activation of other PIN cards.

Once the PIN card 160 has been activated, the sender can use the calling code 125 along with a designated international telecommunications carrier using the toll-free number displayed on the PIN card 160 to call the intended recipient, informing him or her that the funds are available for transfer, disclosing the transfer PIN 130, and providing instructions, if necessary, on how to obtain a cash card. Of course, other methods may be used to relay this information, such as e-mail, telegrams, letters or pay telephone calls.

Authorizing Cash Disbursements and Disbursing Cash

There are several ways in which the authorization system can authorize a cash delivery to an intended recipient at an ATM or other dispensing unit, for example.

Figure 9A:
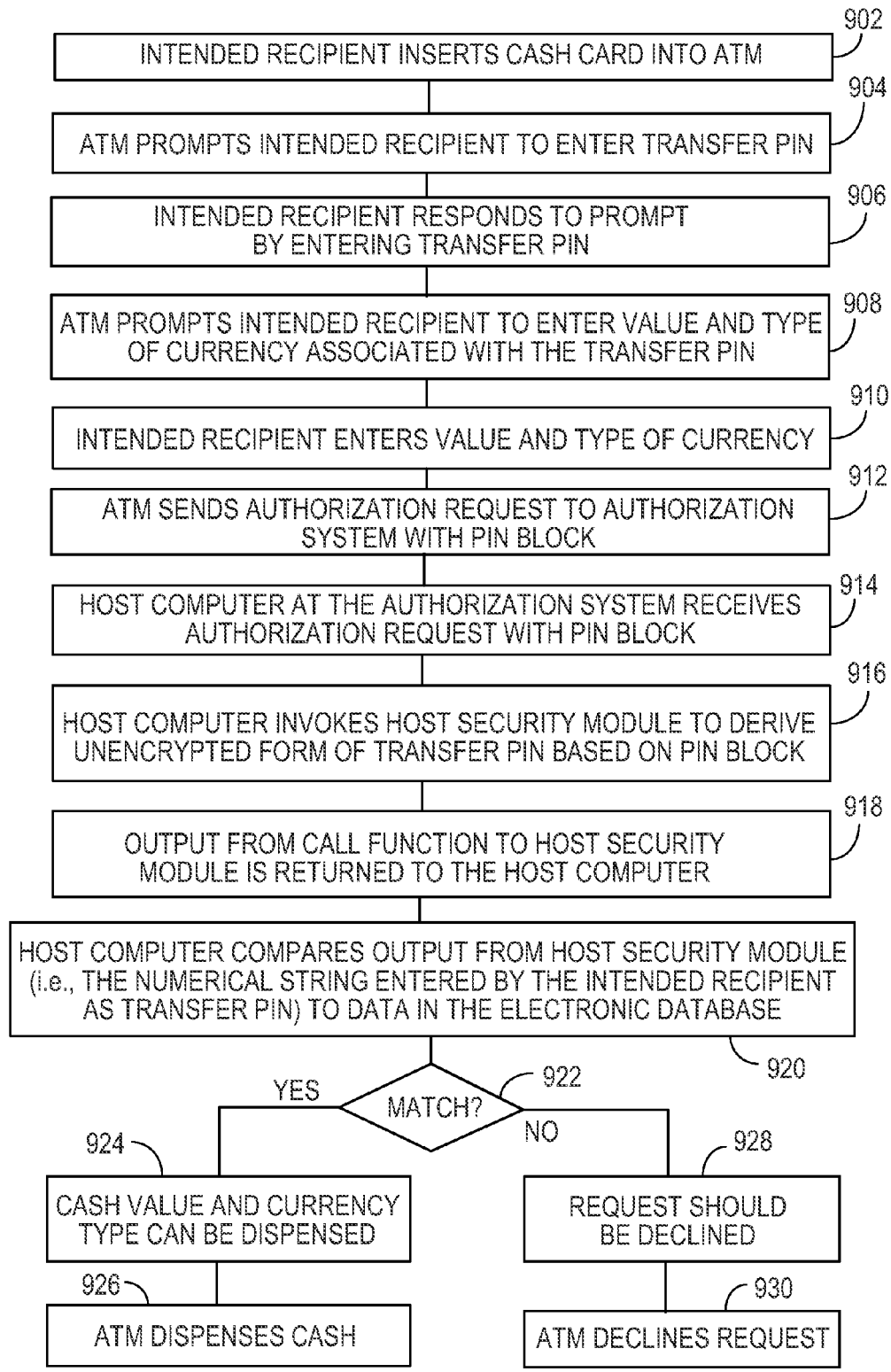
FIGS. 9A-9D are flowcharts showing exemplary methods of an intended recipient's interactions with a system to request a cash disbursement and the associated authorization techniques, which can be conducted, for example, by an authorization system.

FIG. 9A is a flowchart showing one example of an intended recipient's interactions with a system to request a cash disbursement and the associated authorization techniques, which can be conducted, for example, by authorization system 140. The techniques represented in the illustrated flowchart are generally applicable if the authorization system's electronic database includes database entries that identify the activated PINs and their associated values and currency types.

According to the illustrated embodiment, the intended recipient starts the process (at 902) by inserting a cash card 310 into an ATM or other dispensing unit (e.g., ATM 60), thereby activating the ATM 60 to interact with the intended recipient and the authorization system, for example, to facilitate the techniques disclosed herein. More particularly, activation typically enables the ATM 60 to receive additional data from and/or prompt the intended recipient to input additional data that may be relevant to the techniques disclosed herein. Inserting the cash card 310 into the ATM typically causes the cash card number to be transferred to the ATM as well.

In the illustrated method, once activated, the ATM 60 prompts the intended recipient (at 904) to enter the transfer PIN that the intended recipient received from the sender. This prompt, and the other prompts discussed herein, can be in the form of a visible request on the screen at the ATM that the intended recipient enters the transfer PIN. The request may take other forms, such as verbal prompts, as well.

The intended recipient responds to the prompt (at 906) by entering the transfer PIN. In various implementations, the intended recipient can enter the transfer PIN (and other data) in a variety of different ways including, for example, using a hardware keypad on the ATM 60, using a software-implemented keypad on a touch-sensitive video screen, speaking the transfer PIN into a microphone at the ATM 60, etc.

According to the illustrated method, the ATM 60 further prompts the intended recipient (at 908) to enter the value and type of currency associated with the transfer PIN that the intended recipient entered previously. The intended recipient responds (at 910) by entering the value and type of currency (e.g., 1,000 Mexican pesos) associated with the transfer PIN, which the intended recipient previously learned from the sender.

The ATM (at 912) then sends an authorization request over a communications network to the authorization system 140. The authorization request is a request by the ATM to dispense the value and currency entered by the intended recipient at the ATM.

In a typical implementation, the authorization request includes a PIN block, which is an encrypted combination of the transfer PIN and the cash card number 350 associated with the cash card used by the intended recipient to access the system at the ATM. As indicated above, in certain implementations, the cash card number 350 includes an Issuer (or Bank) Identification Number (IIN/BIN) which facilitates routing cash card transaction information between the ATM and the authorization system 140, a unique card number that is associated with the cash card 310, and one or more check digits. In a typical implementation, the ATM has a host security module to perform various encrypting and other security-related functions.

In addition to the PIN Block, the authorization request, in some instances, can contain other information as well. In some instances, this can include as many as 30 or more other fields in clear text. This other information can include, for example, the requested value and currency type, the cash card number as well as other fields related to the transaction.

In some implementations, the message is an ISO 8583 message. ISO 8583 refers to the International Organization for Standardization (ISO) standard, entitled Financial transaction card originated messages—Interchange message specifications and is the international standard for systems that exchange electronic transactions made by cardholders using payment cards.

The authorization system 140 (at 914)—more particularly, the host computer 142 at the authorization system—receives the authorization request (at 914). The host computer 142 extracts the PIN Block from the authorization request and invokes (at 916) its own host security module 144 to derive the PIN that was entered by the intended recipient, in unencrypted form, at the ATM based on the information received at the authorization system 140 from the communications network. In a typical implementation, this derivation can be executed by virtue of a specific function call on the host security module 144 where the input is the function request code, the PIN Block included in the received authorization request and a private encryption key that is shared with the ATM where the authorization request was originated. The output of the specific function call on the host security module 144 includes the numerical string in unencrypted form that was entered by the intended recipient at the ATM in response to being prompted to enter the PIN. This output of the call function to the host security module is returned (at 918) to the host computer.

The host computer 142 (at 920) compares the output of the host security module call function (i.e., the numerical string that was entered by the intended recipient as the transfer PIN) and the cash value and/or the currency type as entered by the intended recipient at the ATM with data stored in the authorization system's 140 electronic database 146. More particularly, in a typical embodiment, the host computer 142 checks whether there is a database entry in the electronic database that matches the numerical string that was entered by the intended recipient as the transfer PIN at the ATM, the cash value as entered by the intended recipient and the currency type as entered by the intended recipient at the ATM.

If the host computer finds a match (at 922) between one of the database entries and the numerical string that was entered by the intended recipient as the transfer PIN at the ATM, the cash value as entered by the intended recipient and the currency type as entered by the intended recipient at the ATM, then the authorization system 140 (at 924) sends an indication to the ATM that the cash value and currency type can be dispensed to the intended recipient.

In response to receiving the indication that the cash value and currency type can be dispensed, the ATM (at 926) dispenses cash in a value and currency type as specified by the intended recipient.

If, on the other hand, the host computer (at 922) does not find a match between one of the database entries and the numerical string that was entered by the intended recipient as the transfer PIN at the ATM, the cash value as entered by the intended recipient and the currency type as entered by the intended recipient at the ATM, then the authorization system 140 (at 928) sends an indication to the ATM that the intended recipient's request should be denied.

In response to receiving the indication that the intended recipient's request should be declined, the ATM (at 930) declines the request. In a typical implementation, this terminates the intended recipient's interactions with the system.

Figure 9B:
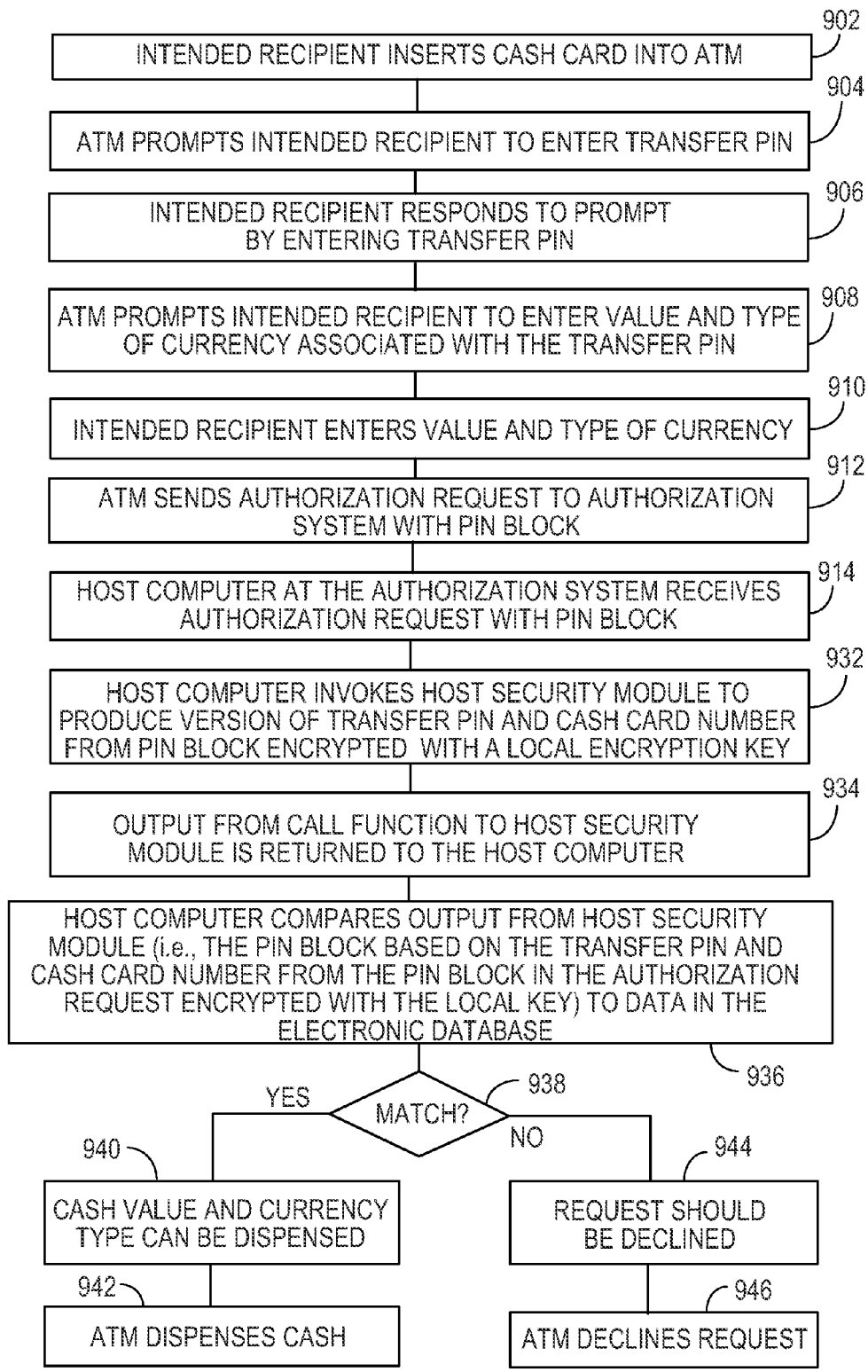

FIG. 9B is a flowchart showing another example of an intended recipient's interactions with a system to request a cash disbursement and the associated authorization techniques, which can be conducted, for example, by authorization system 140. The techniques represented in illustrated flowchart are generally applicable if the authorization system's electronic database includes an exhaustive list of every possible combination of activated transfer PINs and cash card numbers that could be produced by encrypting each combination with a local encryption key.

The steps identified by reference numerals 902 to 914 are identical to the similarly numbered steps in FIG. 9A. The PIN block received by the host computer 914 is encrypted with a key associated with the ATM network. Accordingly, once the host computer at the authorization system 140 receives the authorization request with the PIN block, the host computer 142 extracts the PIN Block from the authorization request and invokes (at 932) its own host security module 144 to produce a version of the extracted transfer PIN and the cash card number encrypted with a local encryption key.

In a typical implementation, this can be implemented by virtue of a specific function call on the host security module 144 where the input is the function request code, the PIN Block received with the authorization request, the local (typically private) encryption key and the (typically private) encryption key shared with the ATM and communications network. In a typical implementation, the output of the function call is a PIN Block based on the transfer PIN and cash card number from the PIN Block in the authorization request encrypted with the local key. This output of the call function to the host security module is returned (at 934) to the host computer.

The host computer 142 (at 936) compares the output of the host security module call function (i.e., the PIN Block based on the transfer PIN and cash card number from the PIN Block in the authorization request encrypted with the local key) and the cash value and/or the currency type as entered by the intended recipient at the ATM with data stored in the authorization system's 140 electronic database 146. More particularly, in a typical embodiment, the host computer 142 checks whether there is a database entry in the electronic database that matches the PIN Block based on the transfer PIN and cash card number from the PIN Block in the authorization request encrypted with the local key, the cash value as entered by the intended recipient and the currency type as entered by the intended recipient at the ATM.

If the host computer finds a match (at 938) between one of the database entries and the PIN Block based on the transfer PIN and cash card number from the PIN Block in the authorization request encrypted with the local key, the cash value as entered by the intended recipient and the currency type as entered by the intended recipient at the ATM, then the authorization system 140 (at 940) sends an indication to the ATM that the cash value and currency type can be dispensed to the intended recipient.

In response to receiving the indication that the cash value and currency type can be dispensed, the ATM (at 942) dispenses cash in a value and currency type as specified by the intended recipient.

If, on the other hand, the host computer (at 938) does not find a match between one of the database entries and the PIN Block based on the transfer PIN and cash card number from the PIN Block in the authorization request encrypted with the local key, the cash value as entered by the intended recipient and the currency type as entered by the intended recipient at the ATM, then the authorization system 140 (at 944) sends an indication to the ATM that the intended recipient's request should be denied.

In response to receiving the indication that the intended recipient's request should be declined, the ATM (at 946) declines the request. In a typical implementation, this terminates the intended recipient's interactions with the system.

Figure 9C:
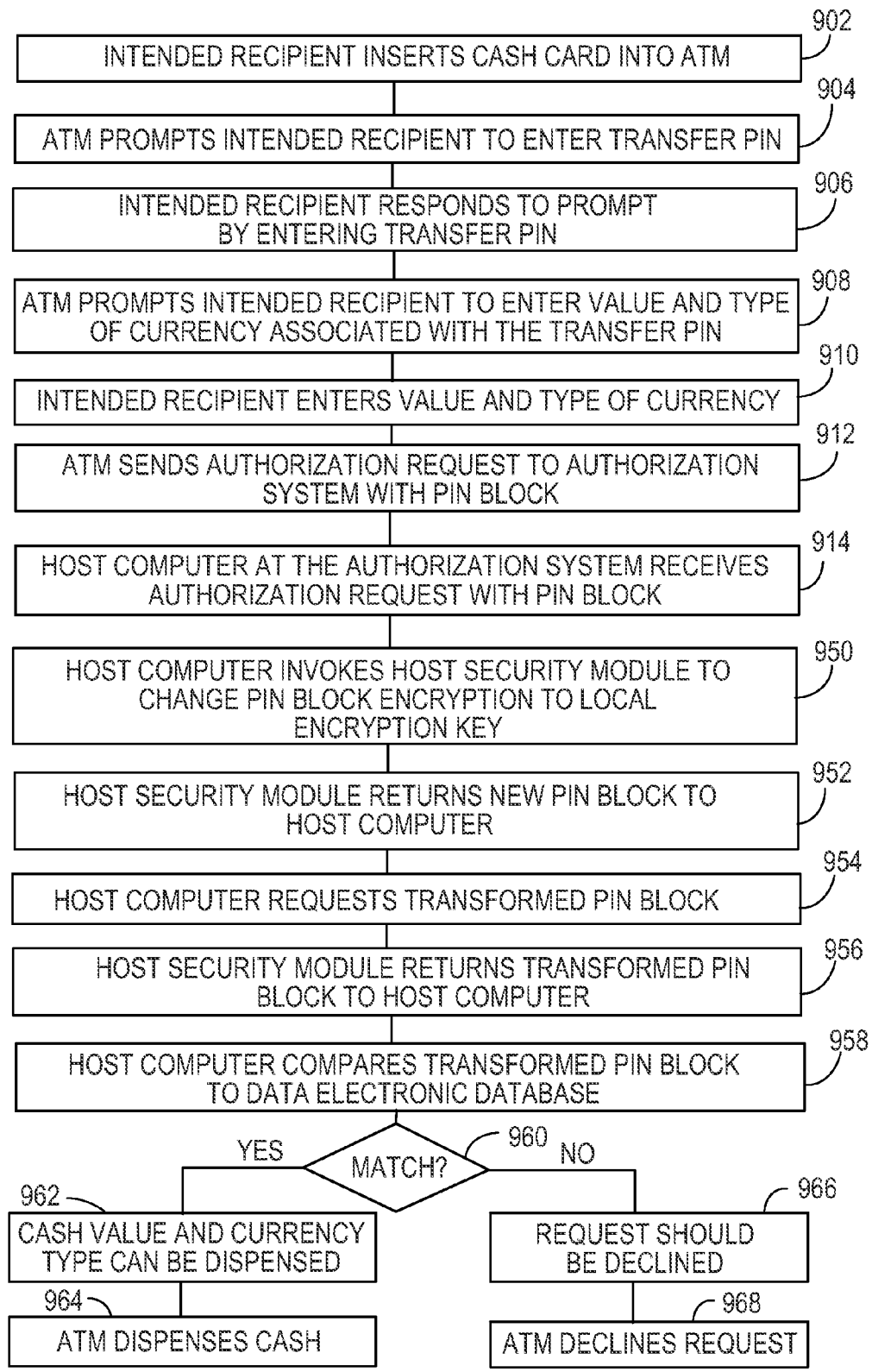

FIG. 9C is a flowchart showing yet another example of an intended recipient's interactions with a system to request a cash disbursement and the associated authorization techniques, which can be conducted, for example, by authorization system 140. The techniques represented in illustrated flowchart are generally applicable if the authorization system's electronic database includes a list PIN blocks that would be formed by encrypting each activated transfer PIN with the same cash card number, which is referred to herein as a "universal" card number.

The steps identified by reference numerals 902 to 914 are identical to the similarly numbered steps in FIG. 9A. Subsequent to step 914 in the illustrated method, the host computer (at 950) extracts the PIN Block and cash card number from the authorization request and invokes its own host security module to change the encryption associated with the received PIN block from the an encryption based on a key associated with the ATM and/or communications network to an encryption based on a local (typically) private encryption key.

The host security module (at 952) returns the new PIN Block encrypted with the local key to the host computer.

According to the illustrated implementation, the host computer (at 954) sends a second request to its host security module to transform the new PIN block, which is encrypted with the local key, to a transformed PIN block by changing the cash card number portion of the transformed PIN block from the number that was received from the ATM to the universal card number. In a typical implementation, this transformation can be implemented by virtue of a function call on the host security module 144 where the input is the function request code, the original cash card number, the universal card number, and the new PIN Block encrypted with the local key. In a typical implementation, the output of the function call is a transformed PIN Block encrypted with the local (typically private) key and having a cash card portion that is associated with the universal card number. This output of the call function to the host security module is returned (at 956) to the host computer.

The host computer 142 (at 958) compares the output of the host security module call function (i.e., the transformed PIN Block) and the cash value and/or the currency type as entered by the intended recipient at the ATM with data stored in the authorization system's 140 electronic database 146. More particularly, in a typical embodiment, the host computer 142 checks whether there is a database entry in the electronic database that matches the transformed PIN Block, the cash value as entered by the intended recipient and the currency type as entered by the intended recipient at the ATM.

If the host computer finds a match (at 960) between one of the database entries and the transformed PIN Block, the cash value as entered by the intended recipient and the currency type as entered by the intended recipient at the ATM, then the authorization system 140 (at 962) sends an indication to the ATM that the cash value and currency type can be dispensed to the intended recipient.

In response to receiving the indication that the cash value and currency type can be dispensed, the ATM (at 964) dispenses cash in a value and currency type as specified by the intended recipient.

If, on the other hand, the host computer (at 960) does not find a match between one of the database entries and the transformed PIN Block, the cash value as entered by the intended recipient and the currency type as entered by the intended recipient at the ATM, then the authorization system 140 (at 966) sends an indication to the ATM that the intended recipient's request should be denied.

In response to receiving the indication that the intended recipient's request should be declined, the ATM (at 968)

declines the request. In a typical implementation, this terminates the intended recipient's interactions with the system.

Figure 9D:
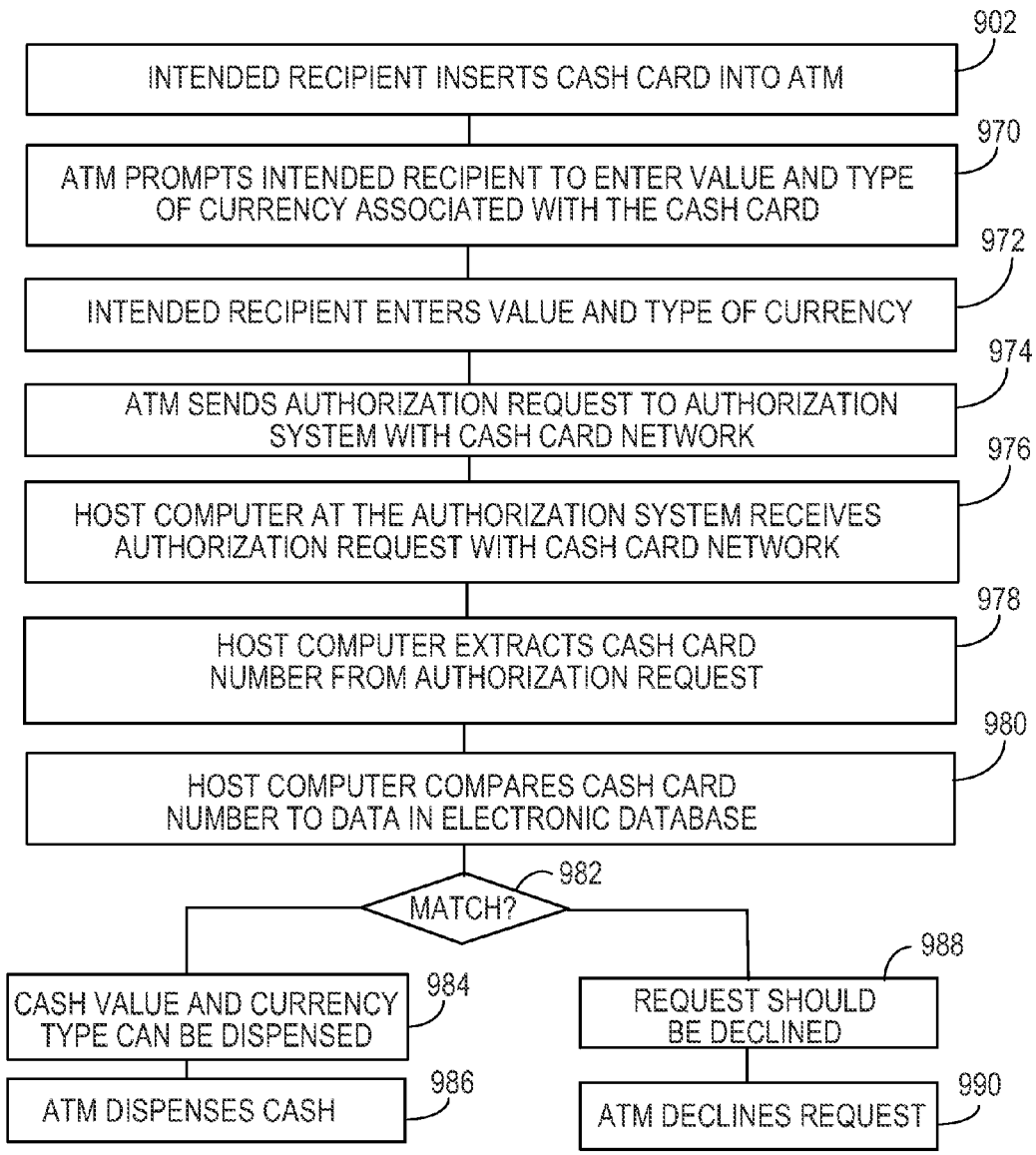

FIG. 9D is a flowchart showing yet another example of an intended recipient's interactions with a system to request a cash disbursement and the associated authorization techniques, which can be conducted, for example, by authorization system 140. The cash card 310 in this example would have a particular associated cash value and currency type. Moreover, the techniques represented in illustrated flowchart are generally applicable if the authorization system's electronic database includes a list authorized cash card numbers and a list of cash values and currency types that correlate to each respective one of the authorized cash card numbers.

According to the illustrated method, the intended recipient starts the process (at 902) by inserting a cash card 310 into an ATM or other dispensing unit (e.g., ATM 60), thereby activating the ATM 60 to interact with the intended recipient and the authorization system, for example, to facilitate the techniques disclosed herein. More particularly, activation typically enables the ATM 60 to receive additional data from and/or prompt the intended recipient to input additional data that may be relevant to the techniques disclosed herein.

In the illustrated method, once activated, the ATM 60 prompts the intended recipient (at 970) to enter the value and type of currency associated with the cash card number that the intended recipient inserted into the ATM previously. The intended recipient responds (at 972) by entering the value and type of currency (e.g., 1,000 Mexican pesos) associated with the cash card. In this example, the intended recipient may have obtained the cash card from a remotely-located sender (via mail, for example).

The ATM (at 974) then sends an authorization request over a communications network to the authorization system 140. The authorization request is a request by the ATM to dispense the value and currency entered by the intended recipient at the ATM.

In a typical implementation, the authorization request includes the cash card number, which may be encrypted, for example, in combination with other information, such as a transfer PIN (or other information) that may have been entered by the intended recipient at the ATM.

The authorization system 140 (at 976)—more particularly, the host computer 142 at the authorization system— receives the authorization request (at 914). The host computer 142 extracts (at 978) the cash card number from the authorization request. The host computer then compares the extracted cash card (at 980), the value entered by the intended recipient at the ATM and the currency type entered by the intended recipient at the ATM to data stored in the electronic database.

If the host computer finds a match (at 982) between one of the database entries and the extracted cash card, the cash value as entered by the intended recipient and the currency type as entered by the intended recipient at the ATM, then the authorization system 140 (at 984) sends an indication to the ATM that the cash value and currency type can be dispensed to the intended recipient.

In response to receiving the indication that the cash value and currency type can be dispensed, the ATM (at 986) dispenses cash in a value and currency type as specified by the intended recipient.

If, on the other hand, the host computer (at 982) does not find a match between one of the database entries and the extracted cash card, the cash value as entered by the intended recipient and the currency type as entered by the intended recipient at the ATM, then the authorization system 140 (at 988) sends an indication to the ATM that the intended recipient's request should be denied.

In response to receiving the indication that the intended recipient's request should be declined, the ATM (at 990) declines the request. In a typical implementation, this terminates the intended recipient's interactions with the system.

A number of embodiments of the invention have been described. Nevertheless, it will be understood that various modifications may be made without departing from the spirit and scope of the invention.

For example, the authorization system 140 and other system functional units can include one or more computing devices operating in conjunction and in cooperation with each other to provide the desired computing and data storage capabilities in accordance with various implementations. Moreover, authorization system 140 may have computing and data storage devices distributed in multiple locations and networked by appropriate communications infrastructure to provide computing and data storage capabilities in accordance with the present disclosure.

In other embodiments, other techniques and technologies, which may or may not involve the participation of bank tellers, attendant-operated or fully automated terminals could be used in connection with the disbursement of funds.

Additionally, while automatic cash dispensing units (e.g., ATMs) are envisioned as providing a straightforward way to implement the techniques disclosed herein, other currency dispensing units such as tellers or kiosks could be used. Furthermore, a value transfer according to the present invention does not necessarily entail cash. Other methods of transferring value, such as crediting a bank account, issuing a check, or issuing a debit card, are encompassed within the scope of the invention.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

U.S. Pat. No. 7,416,115, which is incorporated herein by reference, discusses other features, aspects and applications of the techniques discussed herein.

Thus, particular embodiments of the subject matter have been described. Other embodiments are within the scope of the claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
generating, using a random number generator, a random number at an authorization system configured to authorize a fund transfer;
storing the random number on a first card having a first card number;
generating a key and a string at the authorization system;
encrypting the random number associated with the first card using the key and the string to generate encrypted data at the authorization system;
hashing the encrypted data to generate hashed encrypted data at the authorization system;
storing the hashed encrypted data and the first card number associated with the first card in a database in the authorization system;
storing a second card number on a second card;
storing the second card number in the database in the authorization system;
receiving, at the authorization system, a first request from a first person located at a first location, after the first person purchases the first card at the first location by paying an amount of funds in a first currency, to activate the first card to send an amount of funds in a second currency to a second person located at a second location;
activating the first card at the authorization system in response to receiving the first request from the first person, the activation including associating the first card number with the random number and the amount of funds in the database in the authorization system and informing the first person of the activation of the first card;
receiving, at the authorization system, a second request from the second person located at the second location to receive the amount of funds in the second currency, the second request including an encrypted combination of the random number that the second person received from the first person and the second card number, the encrypted combination generated using a private key, and the second request further including the amount of funds in the second currency;
decrypting, at the authorization system, the encrypted combination extracted from the received second request using the private key to derive the random number;
comparing, at the authorization system, the derived random number to the random number assigned to the first card and stored in the database in the authorization system based on the stored hashed encrypted data; and
comparing, at the authorization system, the amount of funds in the received second request to the amount of funds assigned to the first card and stored in the database in the authorization system; and
authorizing payment of the amount of funds in the second currency to the second person based on the comparisons of the random number) and the amount of funds.

2. The method of claim 1 further comprising ensuring at the authorization system that the random number is not reused for a predetermined period of time.

3. The method of claim 1 further comprising storing the random number and the first card number on the first card magnetically or in a human readable format.

4. The method of claim 1 further comprising storing the second card number on the second card magnetically or in a human readable format.

5. The method of claim 1 wherein the random number on the first card is used by the first person to contact the second person to convey the random number on the first card to the second person.

6. The method of claim 1 wherein the first location and the second location include a point of sale terminal or an automated teller machine.

7. The method of claim 1 further comprising:
generating a second random number at the authorization system;
generating a calling code associated with the first card based on the second random number at the authorization system; and
storing the calling code and a telephone number on the first card at the authorization system for use by the first person to contact the second person to convey the random number on the first card to the second person.

* * * * *